(12) United States Patent
Hershkowitz et al.

(10) Patent No.: US 7,938,886 B2
(45) Date of Patent: May 10, 2011

(54) PROCESS FOR REMOVING A TARGET GAS FROM A MIXTURE OF GASES BY THERMAL SWING ADSORPTION

(75) Inventors: Frank Hershkowitz, Liberty Corner, NJ (US); Harry W. Deckman, Clinton, NJ (US); Paul S. Northrop, Spring, TX (US); Bruce T. Kelley, Kingwood, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 309 days.

(21) Appl. No.: 12/152,870

(22) Filed: May 16, 2008

(65) Prior Publication Data

US 2008/0314245 A1 Dec. 25, 2008

Related U.S. Application Data

(60) Provisional application No. 60/930,827, filed on May 18, 2007.

(51) Int. Cl.
*B01D 53/04* (2006.01)
(52) U.S. Cl. ............................................ 95/115; 95/139
(58) Field of Classification Search ..................... 95/115, 95/139
See application file for complete search history.

(56) References Cited

U.S. PATENT DOCUMENTS

| 3,430,418 A | 3/1969 | Wagner |
| 3,738,087 A | 6/1973 | McCombs |
| 3,751,878 A | 8/1973 | Collins |
| 3,801,513 A | 4/1974 | Munzner et al. |
| 4,194,891 A | 3/1980 | Earls et al. |
| 4,398,927 A | 8/1983 | Asher et al. |
| 4,529,416 A | 7/1985 | Sircar et al. |
| 4,578,089 A | 3/1986 | Richter et al. |
| 4,589,888 A | 5/1986 | Hiscock et al. |
| 4,671,893 A | 6/1987 | Pinto |
| 4,770,676 A | 9/1988 | Sircar et al. |
| 4,775,394 A | 10/1988 | Yamano et al. |
| 4,775,396 A | 10/1988 | Rastelli et al. |
| 4,784,672 A | 11/1988 | Sircar |
| 4,801,308 A | 1/1989 | Keefer |
| 4,816,121 A | 3/1989 | Keefer |
| 4,892,565 A | 1/1990 | Schmidt et al. |
| 4,938,939 A | 7/1990 | Kuznicki |
| 4,964,888 A | 10/1990 | Miller |

(Continued)

FOREIGN PATENT DOCUMENTS

DE 3308304 9/1984

(Continued)

OTHER PUBLICATIONS

D. M. Ruthven; Catherine Thaeron, "Performance of a pareallel passage adsorbent contactor," Gas. Sep. Purif., vol. 10, No. 1, pp. 63-73, 1996.

(Continued)

*Primary Examiner* — Robert J Hill, Jr.
*Assistant Examiner* — Christopher P Jones
(74) *Attorney, Agent, or Firm* — Bruce M. Bordelon

(57) ABSTRACT

The separation of a target gas from a mixture of gases using a thermal swing adsorption process wherein a thermal wave is used, primarily in the desorption step. The process of this invention enables one to separately remove multiple contaminants from a treated gaseous stream.

35 Claims, 11 Drawing Sheets

U.S. PATENT DOCUMENTS

| | | | |
|---|---|---|---|
| 4,968,329 | A | 11/1990 | Keefer |
| 4,988,490 | A | 1/1991 | Nicholas et al. |
| 5,082,473 | A | 1/1992 | Keefer |
| 5,185,139 | A | 2/1993 | Krishnamurthy et al. |
| 5,256,172 | A | 10/1993 | Keefer |
| 5,733,451 | A | 3/1998 | Coellner et al. |
| 5,840,099 | A | 11/1998 | Kratz et al. |
| 5,917,136 | A | 6/1999 | Gaffney et al. |
| 5,938,819 | A | 8/1999 | Seery |
| 6,024,781 | A | 2/2000 | Bulow et al. |
| 6,051,050 | A | 4/2000 | Keefer et al. |
| 6,056,804 | A | 5/2000 | Keefer et al. |
| 6,063,161 | A | 5/2000 | Keefer et al. |
| 6,068,682 | A | 5/2000 | Kuznicki et al. |
| 6,179,900 | B1 | 1/2001 | Behling et al. |
| 6,183,539 | B1 | 2/2001 | Rode et al. |
| 6,266,976 | B1 | 7/2001 | Scharpf |
| 6,280,503 | B1 | 8/2001 | Mayorga et al. |
| 6,299,994 | B1 | 10/2001 | Towler et al. |
| 6,406,523 | B1 | 6/2002 | Connor et al. |
| 6,409,801 | B1 | 6/2002 | Shen et al. |
| 6,451,095 | B1 | 9/2002 | Keefer et al. |
| 6,488,747 | B1 | 12/2002 | Keefer et al. |
| 6,497,750 | B2 | 12/2002 | Butwell et al. |
| 6,503,297 | B1 | 1/2003 | Lu et al. |
| 6,514,318 | B2 | 2/2003 | Keefer |
| 6,530,975 | B2 | 3/2003 | Rode et al. |
| 6,551,380 | B1 | 4/2003 | Reddy et al. |
| 6,565,635 | B2 | 5/2003 | Keefer et al. |
| 6,610,124 | B1 | 8/2003 | Dolan et al. |
| 6,629,525 | B2 | 10/2003 | Hill et al. |
| 6,630,012 | B2 * | 10/2003 | Wegeng et al. ............... 95/106 |
| 6,651,658 | B1 | 11/2003 | Hill et al. |
| 6,691,702 | B2 | 2/2004 | Appel et al. |
| 6,692,545 | B2 | 2/2004 | Gittleman et al. |
| 6,742,507 | B2 | 6/2004 | Keefer et al. |
| 6,840,985 | B2 | 1/2005 | Keefer |
| 6,905,535 | B2 | 6/2005 | Keefer et al. |
| 6,921,597 | B2 | 7/2005 | Keefer et al. |
| 6,964,692 | B2 | 11/2005 | Gittleman et al. |
| 7,037,358 | B2 | 5/2006 | Babicki et al. |
| 7,041,272 | B2 | 5/2006 | Keefer et al. |
| 7,045,553 | B2 | 5/2006 | Hershkowitz |
| 7,087,331 | B2 | 8/2006 | Keefer et al. |
| 7,094,275 | B2 | 8/2006 | Keefer et al. |
| 7,097,925 | B2 | 8/2006 | Keefer |
| 7,148,261 | B2 | 12/2006 | Hershkowitz et al. |
| 7,183,328 | B2 | 2/2007 | Hershkowitz et al. |
| 7,217,303 | B2 | 5/2007 | Hershkowitz et al. |
| 7,326,278 | B2 | 2/2008 | Butters et al. |
| 7,491,250 | B2 | 2/2009 | Hershkowitz et al. |
| 7,503,948 | B2 | 3/2009 | Hershkowitz et al. |
| 7,799,314 | B2 | 9/2010 | Agnihotri et al. |
| 7,815,873 | B2 | 10/2010 | Sankaranarajanan et al. |
| 7,815,892 | B2 | 10/2010 | Hershkowitz et al. |
| 7,846,401 | B2 | 12/2010 | Hershkowitz et al. |
| 7,875,402 | B2 | 1/2011 | Hershkowitz et al. |
| 2002/0004157 | A1 | 1/2002 | Keefer et al. |
| 2002/0112479 | A1 | 8/2002 | Keefer et al. |
| 2002/0144597 | A1 | 10/2002 | Olson |
| 2002/0162452 | A1 | 11/2002 | Butwell et al. |
| 2003/0047071 | A1 | 3/2003 | Dolan et al. |
| 2003/0157390 | A1 | 8/2003 | Keefer et al. |
| 2005/0139072 | A1 | 6/2005 | Landrum et al. |
| 2005/0201929 | A1 | 9/2005 | Hershkowitz et al. |
| 2005/0203327 | A1 | 9/2005 | Jovanovic et al. |
| 2006/0165574 | A1 | 7/2006 | Sayari |
| 2006/0169142 | A1 | 8/2006 | Rode et al. |
| 2006/0174764 | A1 | 8/2006 | Sundaram et al. |
| 2006/0225569 | A1 * | 10/2006 | Schmidt et al. ............... 95/104 |
| 2006/0235256 | A1 | 10/2006 | Reddy |
| 2006/0236862 | A1 | 10/2006 | Golden et al. |
| 2006/0257708 | A1 | 11/2006 | Keefer et al. |
| 2006/0280993 | A1 | 12/2006 | Keefer et al. |
| 2007/0163256 | A1 | 7/2007 | McDonald et al. |
| 2008/0148936 | A1 | 6/2008 | Baksh |
| 2008/0282884 | A1 * | 11/2008 | Kelley et al. ............... 95/96 |
| 2008/0282885 | A1 * | 11/2008 | Deckman et al. ............... 95/98 |
| 2008/0282886 | A1 * | 11/2008 | Reyes et al. ............... 95/98 |
| 2008/0282887 | A1 * | 11/2008 | Chance et al. ............... 95/98 |
| 2008/0282888 | A1 * | 11/2008 | Deckman et al. ............... 95/126 |
| 2008/0282892 | A1 * | 11/2008 | Deckman et al. ............... 96/140 |
| 2008/0314244 | A1 * | 12/2008 | Kelley et al. ............... 95/41 |
| 2008/0314246 | A1 * | 12/2008 | Deckman et al. ............... 95/130 |

FOREIGN PATENT DOCUMENTS

| | | |
|---|---|---|
| DE | 3427804 | 4/1985 |
| DE | 100042601 | 10/1996 |
| EP | 0015545 B1 | 2/1988 |
| EP | 0305919 | 8/1988 |
| EP | 0862937 | 9/1988 |
| EP | 0426937 A1 | 5/1990 |
| EP | 0595100 A1 | 10/1993 |
| EP | 1120149 A1 | 8/2001 |
| EP | 1291067 A2 | 3/2003 |
| EP | 1674555 A1 | 6/2006 |
| EP | 1710008 A1 | 10/2006 |
| EP | 1716906 | 11/2006 |
| FR | 2794993 | 6/1999 |
| GB | 1238822 | 3/1970 |
| GB | 1283822 | 7/1970 |
| GB | 2155805 A | 10/1985 |
| JP | 62046911 | 2/1987 |
| JP | 62105906 | 5/1987 |
| JP | 62225590 | 10/1987 |
| JP | 2-135112 | 5/1990 |
| JP | 06327936 | 11/1994 |
| JP | 08131767 | 5/1996 |
| JP | 08131756 | 6/1996 |
| JP | 09187622 | 7/1997 |
| KR | 2002003963 | 1/2002 |
| WO | 0076629 | 12/2000 |
| WO | 02068093 | 9/2002 |
| WO | 03063276 | 7/2003 |
| WO | 2004000440 | 12/2003 |
| WO | 2004052812 | 6/2004 |
| WO | 2006052937 | 5/2006 |
| WO | 2006074343 | 7/2006 |
| WO | 2006133576 | 12/2006 |
| WO | 2008050289 A1 | 5/2008 |

OTHER PUBLICATIONS

D. M. Ruthven, C. Thaeron, Performance of a parellel passage adsorbent contactor, Separation and Purification Technology 12 (1997) pp. 43-60.

X. Shuai, S. Cheng, A. Meisen, "Simulation of pressure swing adsorption modules having laminated structure," Microporous Materials 5 (1996) pp. 347-355.

Jose A. Delgado, Maria A. Uguina, Jose L. Sotelo, Beatriz Ruiz, Jose M. Gomez; "Fixed-bed adsorption of carbon dioxide/methane mixtures on silicalite pellete," Adsorption (2005 12:5-18.

Jose A. Delgado, Maria A. Uguina, Jose L. Sotelo, Beatriz Ruiz: "Modelling of the fixed-bed adsorption of methane/nitrogen mixtures on silicaliate pellets," Separation and Purification Technology 50 (2006) 192-203.

Shivajic Sircar; "Separation of Methane and Carbon Dioxide Gas Mixtures by Pressure Swing Adsorption," Separation Science and Technology, 23(5&7) pp. 519529, 1988.

Steven M. Kuznicki, Valerie A. Bell, Sankar Nair, Hugh W. Hillhouse, Richard M. Jacubinas, Carola M. Braunbarth, Brian H. Toby, Michael Tsapatsis; "JA titanosilicate molecular sieve with adjustable pores for size-selective adsorption of molecules," Nature, vol. 412, Aug. 16, 2001, pp. 720-724.

Johan van den Bergh, Weidone Zhu, Johan C. Groen, Freck Kapteijn, Jacob A. Moulun, Kenji Yajima, Kunio Nakayama, Toshihiro Tomita, Shuichi Yoshida; "Natural gas purification with a DDR zeolite membrane; permeation modeling with maxwell-stefan equations," Studies in Surface Science and Catalysis, vol. 170, 2007, pp. 1021-1027.

Shuji Himeno, Toshihiro Tomita, Kenji Suzuki, Shuichi Yoshida: "Characterization and selectivity for methane and carbon dioxide adsorption on the all-silica DD3R zeolite"; Microporous and Mesoporous Materials, Elsevier Science Publishing, NY, US, vol. 98, No. 1-3, Dec. 7, 2006, pp. 62-69.

R. Krishna, J.M. van Baten, E. Garcia-Perez, S. Calero; "Difusion of CH4 and CO2 in MFI, CHA and DDR zeolites," Chemical Phyusica Letters, North-Holland, Amsterdam, vl. 429, No. 1-3, Sep. 29, 2006, pp. 219-224.

Frank Hershkowitz, Paul J. Berlowitz, Harry W. Deckman, Elise Marucchi-Soos, Chris S. Gurciullo, Jeffrey W. Frederick, Nick Rados, Rajeev Agnihotri; "A Breakthrough Process for the Production of Hydrogen," AlChE Annual Meeting, Nov. 10, 2004.

Frank Hershkowitz, Paul J. Berlowitz, Richard F. Socha, Elise Marucchi-Soos, Jeffrey W. Frederick; "Hydrogen Production via Steam Reforming in a Reverse-Flow Reactor," 2005 AlChE Annual Meeting, New York, NY.

* cited by examiner

PROCESS FOR REMOVING A TARGET GAS FROM A MIXTURE OF GASES BY THERMAL SWING ADSORPTION

CROSS REFERENCE TO RELATED APPLICATION

This Non-Provisional application claims the benefit of U.S. Provisional Application No. 60/930,827 filed May 18, 2007.

FIELD OF THE INVENTION

The present invention relates to the separation of a target gas from a mixture of gases using a thermal swing adsorption process wherein a thermal wave is developed and utilized, primarily in the desorption step. The process of this invention enables one to separately remove multiple contaminants from a treated gaseous stream via utilizing a single adsorbent contactor to produce multiple product streams.

BACKGROUND OF THE INVENTION

Gas separation is important in various industries, particularly in the production of fuels, chemicals, petrochemicals and specialty products. A gas separation can be accomplished by a variety of methods that, assisted by heat, solids, or other means, generally exploits the differences in physical and/or chemical properties of the components to be separated. For example, gas separation can be achieved by partial liquefaction or by utilizing a solid adsorbent material that preferentially retains or adsorbs a more readily adsorbed component relative to a less readily adsorbed component of the gas mixture, or by several other gas separation techniques known in the industry. One such commercially practiced gas separation process is thermal swing adsorption ("TSA"). TSA has been an important technique for purifying gases ever since Joseph Priestley separated oxygen from air using solar heat on mercuric oxide. Temperature-swing adsorption is a process wherein a bed of adsorbent is used to pull one or more species out of a stream of material, and then the adsorbent bed is regenerated (releasing the adsorbed species) by raising the temperature of the bed.

TSA has the advantage that by swinging the gas mixture's temperature, instead of the pressure, compression costs can be avoided. Another advantage of TSA is that adsorption isotherms are strongly influenced by temperature. Thus, very high purity products can be obtained by adsorbing impurities at low temperature (where adsorption is strong) with the release of a strongly held impurity species being possible by means of high temperature for desorption. However, TSA has several disadvantages. For example, the time to swing adsorbent beds over a temperature range sufficient to affect the separation can be relatively long, which means the equipment must be very large and therefore economically unattractive. Also, heat integration of the TSA cycle, upsets of downstream equipment, and the dilution of product by a large amount of gas used to raise the temperature of the bed are additional disadvantages of TSA processes.

Various methods of supplying heat to the adsorbent for regeneration have been proposed. These include microwave energy (U.S. Pat. No. 4,312,641), installation of electrical heaters inside the packed adsorbent bed of the adsorber (U.S. Pat. No. 4,269,611) and direct application of electric current to the adsorber for electrodesorption (U.S. Pat. No. 4,094,652). U.S. Pat. No. 5,669,962 discloses a dryer comprised of a shell and tube type adsorber heat exchangers wherein the internal tube surface is coated with fine water adsorbent particles. The dryer can be used in rapid thermal swing cycle process. The adsorbent is indirectly heated or cooled by flowing hot or cold feed gas to the separation process through the shell side passage of the heat exchanger. The feed gas acts first as a cold shell side gas in a first absorber heat exchanger then is heated to act as a hot shell side gas in a second absorber heat exchanger undergoing regeneration, and then passes through the tube side of the first absorber heat exchanger where it is dried. Part of the dried gas is used as a purge gas for the tube side of the second absorber heat exchanger. Interchanging the functions of the two adsorber heat exchangers periodically reverses the cycle. The interchange may take place at intervals of from thirty seconds to three minutes. Many of the TSA processes have cycle times significantly longer than this, often as long as 12 hours.

Several approaches have been taken to overcome one or more of the above mentioned disadvantages. For example, one approach was to integrate a heat exchanger with a sorbent material. U.S. Published Patent Application No. US2003/0037672A1 discloses a rapid thermal swing adsorption process wherein separation of contaminants, such as water, from a gas stream such as air is performed using adsorbent packed in tube side passages of a tube and shell heat exchanger adsorber. After a period of adsorption heating fluid is passed through the shell side passage of the adsorber during regeneration and upon exiting from the adsorber is recycled via a heater back into the shell side of the adsorber. During a cooling phase of the regeneration, a cooling fluid is passed through the shell side passage of the adsorber.

U.S. Pat. No. 6,293,998 teaches a spirally wound module, for pressure and temperature swing adsorption processes. The spirally wound module provides high efficiency gas separations by reducing the differential pressure required between the adsorption pressure and the desorption pressure. The apparatus comprises an adsorption zone containing at least one adsorbent paper layer containing a selective adsorbent and an adsorbent spacer spirally wound about a hollow mandrel and in intimate thermal contact with a heat transfer zone.

While attempts have been made in the TSA art to provide a process without the disadvantages previously mentioned none have succeeded in developing a TSA process that is robust enough to make TSA more commercially viable than conventional TSA processes. Therefore, there still remains a need in the art for improvements to the TSA process that can overcome some of the economical and technical hurdles of conventional technology.

SUMMARY OF THE INVENTION

In an embodiment of the present invention there is provided a process for selectively removing a first target gas component from a gas mixture containing said first target gas component and a product gas component, said process comprising:

a) providing a temperature swing adsorption gas separation unit containing at least one adsorbent contactor at an initial temperature, wherein the adsorbent contactor is comprised of a plurality of substantially parallel open flow channels, and wherein the channel surface of at least a portion of said flow channels is comprised of an adsorbent material that has a selectivity for said first target gas component over said product gas component of greater than 1;

b) passing said gas mixture through at least a fraction of said flow channels thereby resulting in the adsorption of at least a portion of said first target gas component from the gas mixture onto said adsorbent material, thereby producing a first product gas stream, that has a lower mol % of the first target gas component than said gas mixture;

c) collecting said product gas stream;

d) heating said at least one adsorbent contactor having said first target gas component adsorbed thereon with a heat transfer fluid to an effective temperature that will result in the desorption of at least a fraction of said first target gas component from said adsorbent material, thereby resulting in a first waste gas stream that has a higher mol % concentration of the first target gas component than said gas mixture;

e) collecting said first waste gas stream; and f) cooling said least one adsorbent contactor to the initial temperature;

wherein a thermal wave is generated in the adsorbent contactor in the desorption step d) thereby creating a thermal wave temperature gradient, which thermal wave temperature gradient moves along the length of the at least one adsorbent contactor and which adsorbent contactor has a $\Delta T_{HT}$ ranging from about 0 to about 50° C. wherein $\Delta T_{HT}$=H/h wherein $\Delta T_{HT}$ is the heat transfer delta-temperature, h is equal to the heat transfer coefficient, and H is the heat rate requirement.

In a preferred embodiment of the present invention, the gas mixture is comprised of a flue gas and the first target gas component is $CO_2$.

DETAILED DESCRIPTION OF THE INVENTION

Figure 1:
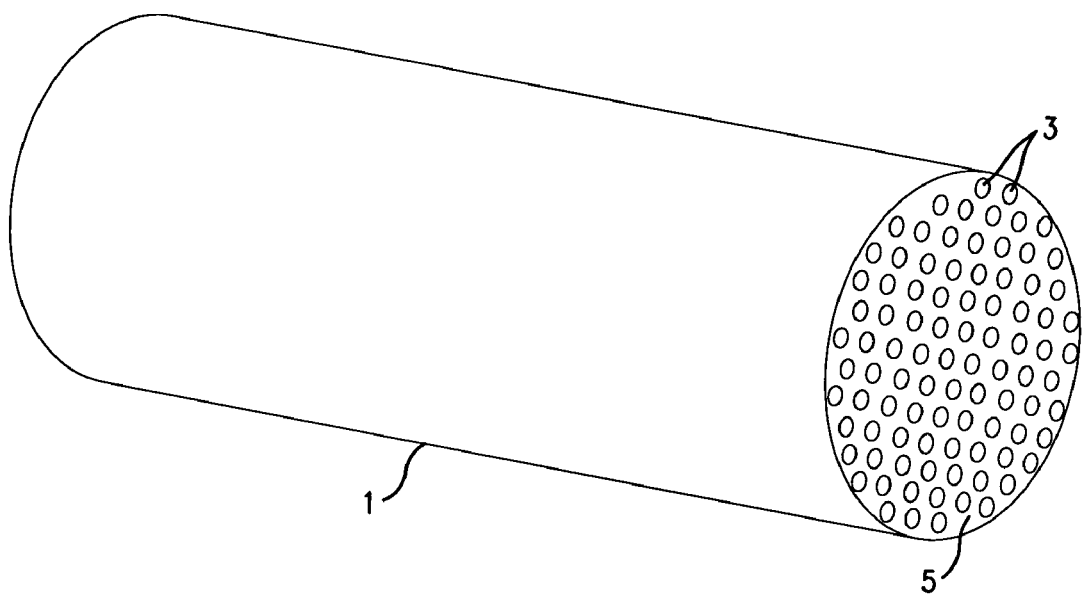
FIG. 1 hereof is a representation of one embodiment of a parallel channel contactor of the present invention in the form of a monolith directly formed from the microporous adsorbent of the present invention and containing a plurality of parallel channels.

The present invention is directed to an improved TSA process that utilizes the formation of thermal waves during the adsorption and desorption steps to enhance the separation of one or more contaminant gaseous components from a gas mixture. As previously mentioned, TSA is a process wherein a bed of adsorbent is used to adsorb one or more species from a fluid stream, typically a gaseous stream. The adsorbent bed is regenerated by raising the temperature of the bed.

In a TSA process, an adsorbent material is utilized that under the adsorption conditions utilized, the adsorbent material selectively adsorbs more of one of the feedstream molecular components (referred to herein as the "target gas", "target gas component", or the "strongly adsorbed component") relative to a second molecular component (referred to herein as the "product gas", "product gas component", or the "weakly adsorbed component"). For instance, in an embodiment herein, the feedstream to an adsorbent contactor gas mixture comprised of a flue gas (or combustion gas") which contains a Component A, $CO_2$ (a target gas component), and a Component B, $N_2$ (a product gas component), wherein an adsorbent material is utilized which has a selectivity for $CO_2$ over $N_2$ of greater than 1.

Unless otherwise noted, the term "selectivity" as used herein is based on binary (pairwise) comparison of the molar concentration of components in the feed stream and the total number of moles of these components adsorbed by the particular adsorbent during the adsorption step of the process cycle under the specific system operating conditions and feedstream composition. For a feed containing component A, component B, as well as additional components, an adsorbent that has a greater "selectivity" for component A than component B will have at the end of the adsorption step of the swing adsorption process cycle a ratio:

$U_A$=(total moles of $A$ in the adsorbent)/(molar concentration of $A$ in the feed)

that is greater than the ratio:

$U_B$=(total moles of $B$ in the adsorbent)/(molar concentration of $B$ in the feed)

Where $U_A$ is the "Adsorption Uptake of component A" and $U_B$ is the "Adsorption Uptake of component B".

Therefore for an adsorbent having a selectivity for component A over component B that is greater than one:

Selectivity=$U_A/U_B$ (where $U_A>U_B$).

In preferred embodiments of the present invention, an adsorbent material is utilized which has a selectivity of at least one Component A over a Component B of greater than about 5, preferably greater than about 10. In a most preferred embodiment, an adsorbent material is utilized which has a selectivity of at least one Component A over a Component B of greater than about 15.

However, TSA, as conventionally practiced, has several disadvantages. In directly heated TSA processes, a hot fluid is typically flowed through the adsorption bed to raise the adsorbent temperature. The greater the temperature rise, the more fluid is needed. The desorbed impurities thus end up dispersed in a large volume of heating fluid and a significant amount of heat that is used to raise the adsorbent temperature is often not recovered. In some cases, the heat is not recoverable because many directly heated TSA systems are operated with long adsorption times (days) and much shorter regeneration times. Additionally, the occasional and gradual regeneration gives rise to concentration and flow variations in downstream equipment that can be difficult to manage in an otherwise steady state process plant. In indirectly heated TSA systems, the heat can be supplied with a heat exchanger thus avoiding dilution with a heated purge gas. However, heat management and the cyclic nature of indirectly heated TSA processes often presents difficulties.

Practice of the present invention provides a TSA system that does not dilute the desorbed materials into a heating medium and provides a TSA system that uses short (minutes) cycles and provides relatively continuous flows of products that do not upset downstream processing equipment. Practice of the present invention also provides a TSA system that is heat integrated in a way that the majority of the energy of the temperature swing is recaptured and reused. A TSA system is also provided in accordance with the present invention that enables chromatographic (multicomponent) separation of many different species in a feedstream.

The process of the present invention is referred to herein as "Thermal Wave Adsorption" (TWA) which is not suggested in the prior art. The present invention, in its simplest and preferred embodiment, combines an adsorbent material with a heat exchanging device (or simply "heat exchanger"). A heat exchanger typically comprises two sets of channels, each set connected to a different fluid circuit, which sets are in thermal communication with each other so that heat can be readily transferred from one set of channels to the other set of channels. In a preferred embodiment of TWA, adsorbent is placed in one set of heat exchanger channels, while the other set of channels is used to bring heat into and take heat out of the adsorbent device. In this manner, the present invention achieves one of its objectives, which is to avoid dilution of the desorbed materials into a heating medium. The present invention also provides a means to rapidly change the contactor temperature without experiencing large heat losses, or long heat-up and cool-down times.

It is well known that effective adsorption beds are designed with careful attention of mass transfer coefficients, so that concentration gradients in the bed are relatively sharp. Sharp concentration gradients are preferred because they enable feed to be passed through the bed for a long time before "breakthrough" of adsorbate occurs. At the start of the process, adsorbate is at a high concentration within the adsorbent in the upstream part of the bed, and at low concentrations at the downstream part of the bed. As the process proceeds, the dividing line between high concentration and low concentration zones gradually moves towards the bed exit as adsorbate accumulates on the adsorbent bed. The gradient will be shallow if mass transfer is not adequate. Such a condition results in adsorbate beginning to escape the bed long before the bed's capacity to adsorb is well utilized. In practice, high mass transfer is achieved by providing relatively small channels for the feed fluids through which the feed travels. This is accomplished, inter alia, by using beds of small adsorbent particles or using monolithic adsorbents with small channel sizes.

Because it is preferred that these mass transfer rules be met in order to practice the present invention, one cannot simply coat some adsorbent onto the walls of a large diameter tubular (for example 2 inch ID) commercial heat exchanger. The heat exchanged adsorbent contactor of the present invention is designed with adsorbent placed in one set of heat exchange channels. The adsorbent placed in the channels must follow the rules of adsorption, in particular, it must provide mass transfer sufficient to result in sharp temperature gradients. In practice, this means use of space-filling adsorbents, washcoats, pellets or monoliths. Preferably, the adsorbent-containing heat exchanger channels will have a characteristic hydraulic radius for fluid flow that is less than about 1 inch, preferably less than about 0.25 inches, and more preferably less than about 0.1 inches.

In a preferred embodiment, a thermal wave is used to pass heat through the contactor as it transitions from: i) the adsorption to regeneration step; ii) in transitioning from the regeneration to adsorption step; iii) in at least part of the regeneration step: or iv) in at least part of the adsorption step. For purposes of the present invention, a thermal wave is a sharp temperature gradient, that moves linearly (i.e. approximately in a single direction within the contactor) during one step of the thermal swing adsorption/desorption cycle. The speed at which the thermal front (i.e. region with sharp temperature gradient) moves is referred to as the velocity of the thermal wave. The velocity of the wave does not have to be constant and the direction the wave moves and does not have to be the same in the adsorption and regeneration steps. For example, the wave can move co-currently, counter-currently, or crossflow between the adsorption and regeneration steps. It is also within the scope of this invention that no significant thermal wave be present in the adsorption step while there is a significant thermal wave in the regeneration step. The presence of a thermal wave in at least some portion of the thermal swing adsorption/regeneration cycle enables the system to achieve one of the objects of this invention, which is to substantially recuperate and recover the heat required to temperature-swing the bed. This, in turn, improves process efficiency. It also enables the use of very high desorption temperatures that would not normally be considered for TSA operations.

A thermal wave is created within a heat exchange medium when a fluid flows through the medium at a temperature higher or lower than the initial temperature of the heat exchange medium. This phenomena is well known in the art, and is sometimes referred to as 'regenerative' heat exchange. For example, when a hot fluid flows through a cold heat exchange medium, the fluid is cooled and the medium is heated. When heat transfer parameters are adequately high, the majority of the heat transfer occurs in a narrow region within the medium, and that region moves across the medium with time. That narrow region contains a thermal wave, in which (in this example) fluid temperature transitions from hot to cold. The velocity at which the thermal wave moves across the heat exchange medium is slower than velocity of the fluid through the medium, as dictated by the relative heat capacities of the fluid versus the heat exchange medium. As hot fluid continues to be introduced into one end of the heat exchange medium, cold fluid emerges from the other end, until the thermal wave has moved completely across the heat exchange medium. In this application, fluids that are used in the heating or cooling channels of the thermal wave adsorber are referred to as 'hot' fluid, 'cool' or 'cold' fluid, or in the general case as 'thermal' fluid. In some embodiments, process fluids that are used in the adsorption channels may also be used as thermal fluid.

The term "channel system" is used herein to refer to that portion of the contactor that is directly involved with transferring heat between the thermal fluid and the adsorbent. This typically includes the thermal and process fluids, as well as the adsorbent and any channel components through which the heat is being transferred. Specifically excluded from the channel system are contactor components not directly involved in the heat transfer, including for example, conduits that bring fluids into or out of the contactor, or the shell of the contactor. The thermal wave channel system of the present invention is selected so that its heat transfer characteristics enable the desired short cycle times. It is known in the art that a heat transfer system can be characterized by a heat transfer coefficient (h) between the two fluid streams. Correlations for heat transfer coefficient, based on fluid and exchanger properties, are well known. The heat transfer coefficient is most frequently defined based on the heat transfer surface area that separates the two streams.

Heat Transfer Coefficient:

$$h = \frac{BTU}{(ft^2 \text{ area})(^\circ F.)(s)} \text{ or } = \frac{kcal}{(m^2 \text{ area})(^\circ C.)(s)} \quad (1)$$

The required magnitude of the heat transfer coefficient is understood in terms of the heat up or cool-down rate requirement of the system. A heat rate requirement (H) for the system is defined as the enthalpy change over a process step (e.g. regeneration) divided by the step time and the heat transfer area of the channel system. The enthalpy change ($\Delta H$) is computed as the enthalpy of the channel system with fluids at the end of the cycle minus the enthalpy of the channel system with fluids at the beginning of the cycle. With a step time of $\tau$, and a channel system heat transfer area of $a_c$, the steps heat rate requirement (H) can be computed as:

$$H = \frac{|\Delta H_{STEP}|}{\tau \cdot a_c} = \frac{BTU}{(ft^2 \text{ area})(s)} \text{ or } = \frac{kcal}{(m^2 \text{ area})(s)} \quad (2)$$

A heat transfer delta-temperature $\Delta T_{HT}$ is also used herein to characterize the TWA system, as taught herein. $\Delta T_{HT}$ is defined herein as the ratio of heat rate requirement to heat transfer coefficient.

Characteristic heat transfer delta-temperature,
$$\Delta T_{HT} = H/h \quad (3)$$

This characteristic $\Delta T_{HT}$ describes the balance between heat transfer supply and demand. As used herein, the $\Delta T_{HT}$ is calculated using heat transfer coefficients based on the conditions of the various steps (adsorption, regeneration, cooling). The characteristic $\Delta T_{HT}$ is a design parameter for the present invention. Channel sizes and materials, as well as fluid flow rates are chosen to satisfy characteristic $\Delta T_{HT}$ requirements of this invention.

$\Delta T_{HT}$ for the present invention is between about 0° C. and about 500° C. More preferably, the characteristic $\Delta T$ is between about 0° C. and about 50° C. Most preferably, the characteristic $\Delta T_{HT}$ is between about 0° C. and about 10° C.

Figures 8A, 8B, 8C:
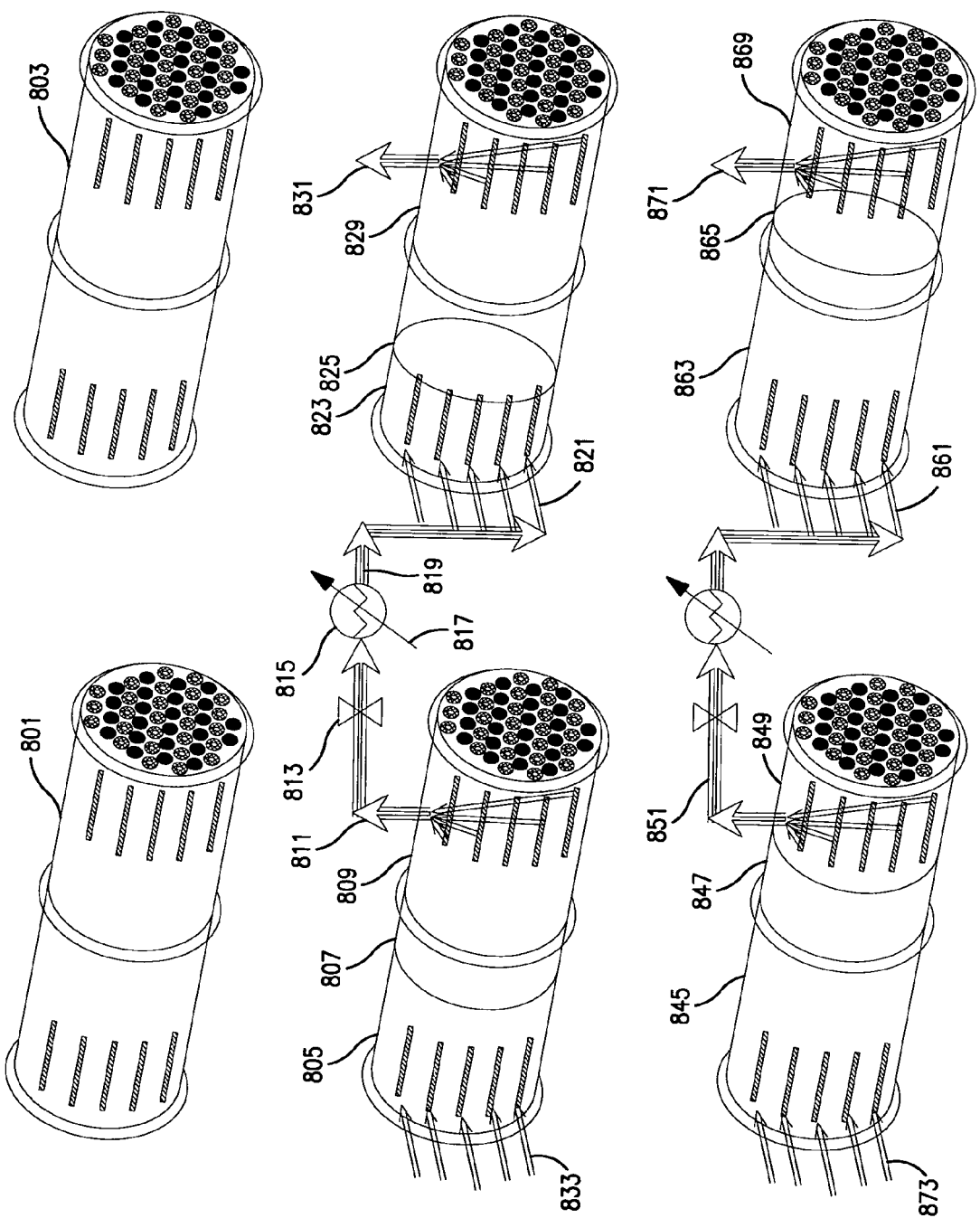
FIG. 8 hereof illustrates the use of a thermal wave to pass heat from one internally heated contactor that has been regenerated to a second contactor that has finished the adsorption step and is being heated for regeneration.

To efficiently utilize a thermal wave for heat recovery, the thermal fluid flowing out of one contactor is sent to another. The thermal fluid flow path between contactors is determined by valves that are timed to route thermal fluid between contactors at appropriate points in the overall swing adsorption cycle. When thermal fluid flows between contactors it may also pass through a heat exchanger that adds or removes heat from the flowing thermal fluid. It may also pass through a device, such as a compressor, pump, or blower that pressurizes it so it can flow at the desired rate though the contactors. A heat storage medium can be configured so that the energy from the thermal wave moving through one contactor is stored before it is passed to a second contactor. A non-limiting example of a storage medium is a packed bed heat exchanger that is cyclically operated. In a packed bed heat exchanger, energy is stored by the heat capacity of the bed. A thermal wave moves though the bed as the energy is stored as well as when it is cooled. The time for a thermal wave to pass though this heat exchanger allows one to adjust the timing of the routing of thermal energy between contactors. Alternatively, energy can be stored in a heat exchanger with a structured heat adsorbing material, such as a monolith The use of a thermal wave to pass heat from one contactor to another is illustrated in FIG. 8 hereof. The contactors shown in FIG. 8 are externally heated monolithic contactors of the type shown in FIG. 4 hereof. The temperature of the contactors in FIG. 8 is overlaid as a semi-transparent gray coloring on the contactors. FIG. 8a shows the hot contactor 801 at the end of the regeneration step and a cooler contactor 803 that has finished an adsorption step. The darker gray color overlaying the contactor 801 indicates a higher temperature (for example in excess of about 95° C.) and the lighter gray coloring on contactor 803 indicates a cooler temperature (for example less than about 40° C.). FIG. 8b shows the initial stage of cooling the contactor 801 and heating of the contactor 803. To cool contactor 801, cool fluid 833 is flowed through the heating/cooling channels of the contactor. As a heat front moves through the contactor, the temperature of the end near the entrance 805 approaches the temperature of the cooling fluid 833 while the temperature of the far end of the contactor 809 remains near the original temperature after regeneration. A sharp front 807 with a large temperature gradient separates the hot and cooler sections of the contactor. Hot fluid pushed out of the contactor is gathered to form stream 811 that is flowed to the cool second contactor 803. The stream flows through a stream selection valve and/or shutoff valve, 813, that can used to stop flow or change the routing of thermal fluids between different contactors. Optionally, stream 811 is passed through a heat exchanger 815 to add heat to the stream 819 being sent to cool contactor 803. An optional stream 817 is flowed through the heat exchanger to provide heat transferred by heat exchanger 815. In one embodiment, the stream 817 is derived from waste process heat. When the present invention is used to capture $CO_2$ from flue gas in a preferred embodiment, stream 817 comes from the inter-stage coolers of a compressor string (not shown) used to compress $CO_2$ to pressures greater than about 1,000 psi for pipelining to a sequestration site. A hot stream 821 with a temperature near or above the temperature of the contactor after regeneration is passed into the cool contactor. This stream 821 drives a heat front through the contactor and the temperature of the end near the entrance 823 is nearly that of the hot fluid 821 while the temperature of the far end of the contactor 829 remains near the original temperature after regeneration. Another sharp front 825 with a large temperature gradient separates the hot and cooler sections of the contactor. Cold fluid is driven out of the contactor and is gathered to form stream 831. This thermal fluid can be used to limit the temperature rise in a contactor that is adsorbing the target components (for example $CO_2$ and water out of flue gas) or can be used to cool another contactor. In one embodiment the cool fluid in stream 831 is sent back to form stream 833. Optionally stream 831 is cooled via heat exchanged before it is sent back to form stream 833. As shown in FIG. 8 hereof, the changes in the hot and cold sections of contactors 801 and 803 are not in the same proportion. This is in part due to the fact that as molecules desorb some of the heat transferred to contactor 803 is taken up by the heat of desorption. If heat exchanger 815 is used to supply heat it is possible to make the thermal waves in the two contactors (801 and 803) travel at the same velocity.

FIG. 8c shows the progression of the thermal waves through the contactors (801 and 803) as the process continues. Cool fluid 873 continues flowing through the heating/cooling channels of the contactor 801. The thermal front has moved further through the contactor. Temperature in the first two thirds of the contactor 845 is nearly that of the cooling fluid 873 and the temperature of the far end of the contactor 849 remains near the original temperature after regeneration. A sharp front 847 with a large temperature gradient still separates the hotter and cooler sections of the contactor. Hot fluid pushed out of the contactor is gathered to form stream 851 that is flowed into the second contactor 803. A hot stream 861 at a temperature near or above the temperature of the contactor after regeneration is passed into the second contactor and continues to drive a heat front through the second contactor. Temperature in the first half 863 of second contactor is nearly that of the hot fluid 861 while the temperature of the far end 869 of the contactor remains near the original temperature after adsorption. A sharp front 865 with a large temperature gradient again separates the hotter and cooler sections of the contactor. This front has only progressed about half way down the contactor while the front in the other contactor has progressed about two-thirds of the way along the contactor. This difference in velocities of the two thermal fronts is due in part to the heat of desorption. Cold fluid driven out of the contactor is gathered to form stream 871 which continues to be used in other contactors.

Non-limiting examples of other thermal process integrations that can be used in the practice of the present invention involve shuttling heat between one or more contactors undergoing an adsorption step and one or more contactors undergoing a regeneration step.

Figure 9:
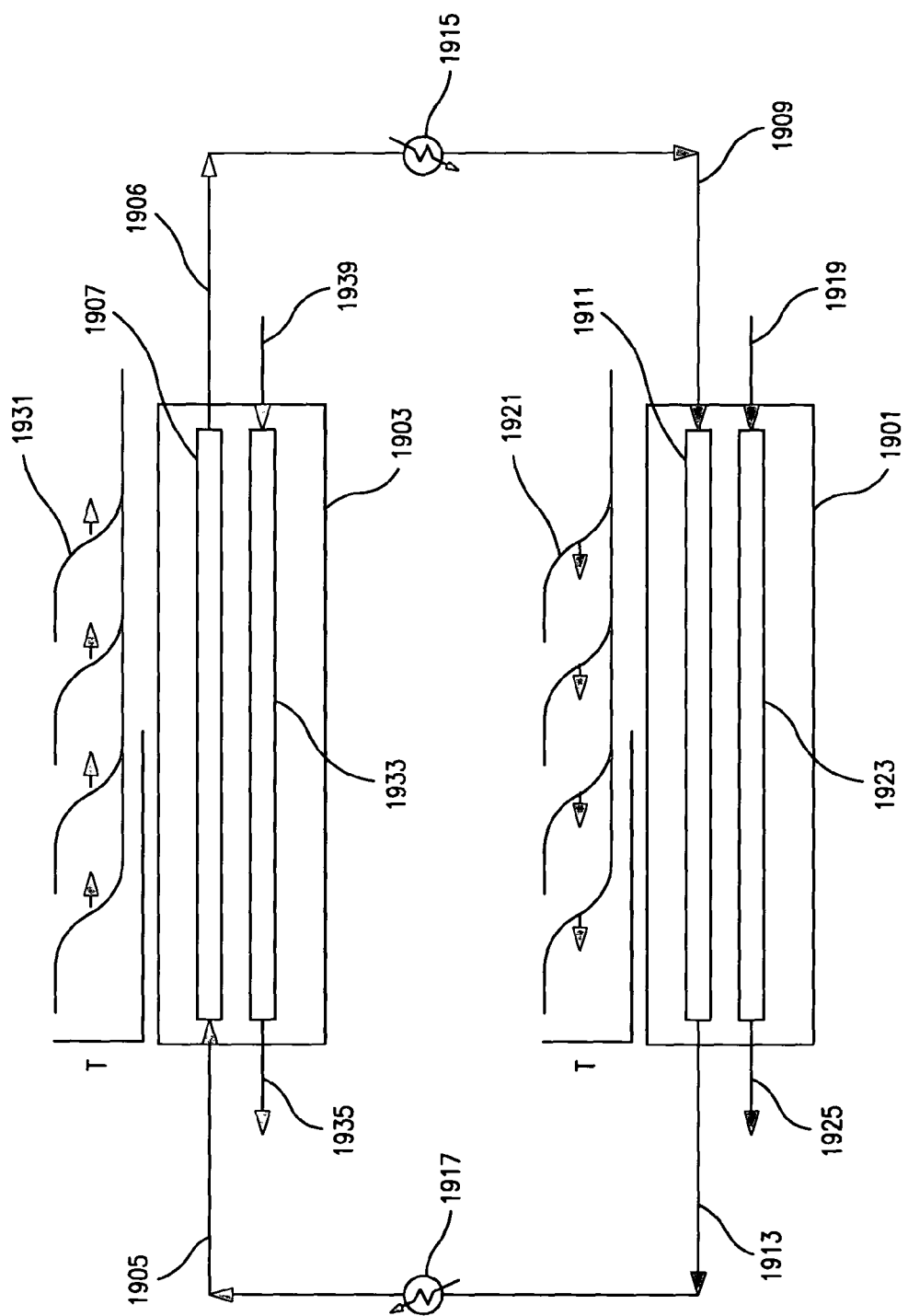
FIG. 9 is an illustration of a system of the present invention wherein one contactor undergoes an adsorption step while another contactor undergoes a desorption step.

In one embodiment, the thermal wave adsorption system may be operated with two contactors, one undergoing regeneration and heating while the other undergoes adsorption and cooling. This embodiment is shown schematically in FIG. 9 hereof and at any given time, a substantially equal flow of heat transfer medium will be flowing between the contactors for heating and cooling. The example shown in FIG. 9 hereof includes a contactor 1903 that is being heated while another contactor 1901 is being cooled. Because of the temperature gradient that is created by the flow of heat transfer medium through the contactor, the heating (and cooling) is achieved with high levels of heat (or cool) captured within the contactor. During heating, a hot fluid 1905 is introduced into first contactor 1903 and emerges from heating/cooling passage 1907 in a cool state 1906 until such a time that temperature breakthrough occurs and substantially all of the contactor is heated. Simultaneously, cooled heat transfer medium 1910 is introduced into the heating/cooling passages 1911 of the second contactor 1901. Traveling right-to-left the flowing cooling medium 1910 creates a thermal wave such that the contactor unit 1901 is cooled while the heat transfer medium is reheated. The reheated heat transfer medium 1913 is then recirculated back to heat the first contactor unit 1903. In practice, due to heat losses (for example, desorbed material leaving the system hot) some heat must be added to increase the temperature of the hot heat transfer medium to its original temperature in stream 1905. In FIG. 9, this additional heat is added to stream 1913 by passing it through heat exchanger 1917.

In one embodiment of the present invention, heat is removed from the heat transfer medium to maintain it at a predetermined temperature notwithstanding temperature breakthrough from the contactor unit. Typically, the cooled thermal fluid (exiting the cool-down step) will be at a temperature that approaches the separation feed temperature. Cooling via heat exchange 1915 can also be provided to decrease the cooling fluid temperature to a temperature lower than that of the incoming flue gas stream 1919, thus pre-cooling the adsorbent to a temperature below the incoming separation feed temperature. A process gas mixture (for example flue gas) 1919 is passed into adsorbent lined channels 1923 at the cool end of contactor 1901. The flow rate of the process gas mixture is such that target components (for example $CO_2$ and optionally water, SOx and NOx) are adsorbed before reaching the thermal front. The progression of the thermal front (or wave) through contactor 1901 is plotted 1921 schematically in FIG. 9.

During adsorption, the strongest-adsorbing components will attach most strongly to the contactor adsorbent and will be the least mobile. These components will occupy the regions of adsorbent closest to the inlet and will displace weakly adsorbed materials from that region. Over the period of adsorption, the adsorbates will order themselves from strongest to weakest along the contactor adsorbent from the inlet to outlet of the adsorption channels of the contactor. When the process gas mixture is a flue gas, water is the most strongly adsorbed component for most adsorbent materials. In all cases, a sharp concentration front moves through the contactor and the position of the front at all times remains behind the thermal front. As such, a target component (for example $CO_2$) is always adsorbed in the cool section of contactor 1901. Stream 1925 emerges from the adsorbent lined channels 1923 with most of a target component (for example $CO_2$) removed and optionally most of several other target components (such as water, SOx and NOx) also removed. In a preferred embodiment, the composition of stream 1925 is such that more than about 80 mol % and preferably more than about 95 mol % of the target component (for example, $CO_2$) present in the process gas mixture (for example flue gas) 1919 entering the adsorbent channel 1923 is removed. In FIG. 9, the orientation of contactor 1903 during a previous adsorption step was such that the most weakly adsorbed species are nearest to the end where the hot fluid 1905 is introduced. The motion of the thermal front (or wave) through the contactor is plotted 1931 schematically in FIG. 9. It is seen that the thermal waves (1931 and 1921) move in opposite directions through the contactors. Depending upon the detailed nature of the sorbent and the molecules being sorbed it may be preferable to arrange the piping between contactors so that the thermal waves run co-currently through the contactors.

When the thermal waves 1931 and 1921 move counter-currently through the contactor, the region of the contactor containing the weakest-held adsorbates will be heated first, followed by next weakest, and next, until the strongest-adsorbed materials are heated at the end. The order in which these adsorbates are released into adsorbent lined flow channel 1933 matches the order in which they are heated. If the piping is arranged so that the thermal waves move co-currently through the contactors, the region of the contactor containing the strongest-held adsorbates will be heated first, followed by next strongest, and next, until the weakest-adsorbed materials are heated at the end. Depending on properties of the adsorbent, it can be advantageous to pipe the contactors so that the thermal waves move co-currently. In either case separate streams of adsorbates can be collected in different lines or vessels to achieve a continuous multicomponent adsorptive (a.k.a. chromatographic) separation.

The adsorbates can flow out of the contactor being regenerated co-currently or counter-currently to the thermal wave passing through the contactor. In this illustration, the desorbed species flow in stream 1935 out of the adsorbent lined channels 1933 of contactor 1903 counter-currently to the direction of the thermal wave. It is also possible to achieve a continuous multicomponent adsorptive (a.k.a. chromatographic) separation with a co-current desorption. In such an alternative embodiment, the desorption flow is taken in the opposite direction to what is illustrated in FIG. 9, such that the weaker-adsorbing components must flow back over the stronger-adsorbing on the way out of the bed. This approach can provide a cleaner condition of the adsorption-step bed exit, resulting in higher-purity effluent during the adsorption step. It can also result in a higher degree of separation of adsorbates in the adsorbate effluent stream under some conditions. In an optional desorption modality, a sweep or purge fluid 1939 is used to assist the desorption process. When the desorption is performed co-currently with the thermal wave, a preferred embodiment of this optional modality introduces the sweep with a velocity that nearly matches that of the thermal wave moving along the bed.

It may be desirable to operate with a multiplicity of contactor units in such a manner that several units are coupled in heating and cooling operations, while other units are involved in adsorption (and/or desorption). In this operation, the contactor can be substantially cooled by the circulating heat transfer medium before it is switched into service for adsorption. The advantage of such an operation is that the heat used to swing the bed is retained in the heat transfer medium. If adsorption were to proceed simultaneously with cooling, then a substantial part of the heat in the bed would be lost to the adsorbate-free feed, and a higher heat load would be needed to restore the high temperature of the heat transfer medium.

In addition, in many cases (particularly for impurity removal) the time required for adsorbent regeneration may be shorter than the time required for the contactors adsorption capacity to be fully utilized. In such cases, it may be desirable to have several contactors in the adsorbing phase while two paired-contactors are in the heat/regeneration phase and the re-cooling phase. In a preferred embodiment, the several contactors engaged in adsorption are connected in serial fashion, such that the most-recently regenerated contactor unit is the last bed in line, and the first unit in line will be next to be regenerated. In another preferred embodiment, the adsorbing units are connected in parallel, such that each adsorber treats a fraction of the whole feed. In yet another embodiment, thermal wave storage devices are used to store and allow proper timing of the cycles.

When the contactors are used in this manner, it is acceptable for each contactor unit to be oriented in co-current flow, counter-current flow, cross-flow, or any other suitable flow configuration. However, in a preferred embodiment, the contactors are used in co-current flow and/or counter-current flow orientation.

Physical architecture of the contactors used in the practice of the present invention depends on whether the contactor is internally heated or externally heated during regeneration. With internally heated contactors, the gas or fluid used to heat the contactor directly contacts the adsorbent material. Therefore, in the internally heated contactors utilized in the present invention, the heat transfer coefficient (h) is defined as the fluid to solid heat transfer coefficient. As such, the gas or fluid used to heat the contactor during regeneration passes through the same macropore volume that the flue gas did during the adsorption step. The gas, or fluid, used to heat and regenerate the adsorbent can flow co-current, counter-current or orthogonal (i.e. cross-flow) to the direction that the flue gas flows. For such internally heated contactors, the target components liberated during the thermal regeneration step mix with the gas or fluid used to regenerate the contactor. For flue gas separations, target components would be species such as $CO_2$ and any water that is present in the flue gas.

It is preferred that the target components be separated from the gas, or fluid, used to regenerate the internally heated contactor. Externally heated contactors have a separate set of channels to carry gasses or fluids used to heat and cool the contactor. Therefore, in the externally heated contactors utilized in the present invention, the heat transfer coefficient (h) is defined for the transfer of heat from heating/cooling channels to/from the process channels. It is also preferred that the separate set of channels are sealed so that gasses used to heat and cool the contactor do not mix with the target components liberated during the regeneration step.

Non-limiting examples of internally heated contactors include: a bed packed with pellets containing a selective adsorbent for at least one target component; a beaded selective adsorbent bed; a bed packed with fibers or a fibrous mat containing the selective adsorbent for at least one target component, structured adsorbent contactors, and parallel channel contactors. Structured adsorbent contactors contain a plurality of flow channels that allow gas or fluid to physically flow through the contactor. A flow channel is that portion of the contactor in which gas flows if a steady state pressure difference is applied between the points or place at which a feedstream enters the contactor and the point or place a product stream leaves the contactor. The flow channel is not considered to be part of the open mesopore or macropore volume of the contactor. Parallel channel contactors form a preferred subset of structured adsorbent contactors. In a parallel channel contactor there exists at least one set of channels that are substantially parallel to each other.

Heat must be readily transportable from the heating/cooling channels to the adsorption medium in its channels in order to operate as an externally heated contactor. Preferred externally heated contactors suitable for use in the present invention will have high heat transfer coefficients. In one embodiment of the present invention, the heat exchanger channels are characterized in terms of the boundary between the feed containing channel and the channels containing heating/cooling medium. That boundary can be characterized as having a cross-sectional area (A) and a perimeter (P). A parameter D can be calculated as $4A/P$. For example, for cylindrical tubes packed with adsorbent pellets, D will equal the tube diameter. In a preferred embodiment of the present invention, the parameter D for the heat exchanger channels that contain adsorbent is less than about 1 inch, more preferably D is less than about 0.5 inch.

The heat adding/removing channels are also designed in a manner that results in a sharp temperature gradient or "thermal wave" behavior. Temperature gradients may be related to concentration gradients. However, the primary controlling parameter is the heat transfer coefficient between the thermal fluid and the mass of the heat exchanger. When the heat exchange-adsorber system is designed with appropriate heat transfer and conduction parameters, a temperature wave will be created during the heating and cooling steps. Such a condition enables the system to substantially recuperate and recover the heat required to temperature-swing the bed. This, in turn, enables the use of very high desorption temperatures that would not normally be considered for TSA operations. One arrangement for a heat integrated thermal wave adsorption process was discussed above and as shown in FIG. 9.

Operating externally or internally heated contactors with a thermal wave that passes through the contactors provides significant benefits over previous conventional gas separation methods, such as vessels containing adsorbent beads or extruded adsorbent particles. These swing adsorption technologies are all well known to those having ordinary skill in the art and they can be applied to remove a variety of target gases from a wide variety of gas mixtures. It is possible to significantly improve the recovery percentage of a light component as a product component of a process gas mixture by use of the present invention. The light component is taken to be the species, or molecular component, or components that are not preferentially taken up by the adsorbent in the adsorption step of the process. With the contactors of the present invention, it has been unexpectedly discovered that total recovery of the light component achieved in the swing adsorption process can be greater than about 80 mol %, more preferably greater than about 85 mol %, even more preferably greater than about 90 mol %, and most preferably greater than about 95 mol % of the content of the light component introduced into the process. Recovery of the light component is defined as the time averaged molar flow rate of the light component in the product stream divided by the time averaged molar flow rate of the light component in the feedstream. Similarly a heavy component is taken to be the species, or molecular component, or components that are preferentially taken up by the adsorbent in the adsorption step of the process. These heavy components are also referred to as target components. Recovery of the heavy component is defined as the time averaged molar flow rate of the heavy component in the product stream divided by the time averaged molar flow rate of the heavy component in the feedstream.

In a preferred embodiment, the recovery of the light component is enhanced by utilizing structured adsorbent contactors that contain a low volume fraction of open mesopores and macropores. That is, the structured bed adsorbent contactors of the present invention contain less than about 20 vol %, preferably less than about 15 vol %, more preferably less than about 10 vol %, and most preferably less than about 5 vol % of their pore volume in open pores in the mesopore and macropore size range. Mesopores are defined by the IUPAC to be pores with sizes in the 20 to 500 angstrom size range. Macropores are defined herein to be pores with sizes greater than about 500 Angstroms and less than about 1 micron. Because the flow channels are larger than 1 micron in size, they are not considered to be part of the macropore volume. By open pores we mean meso and macropores that are not occupied by a blocking agent and that are capable of being occupied, essentially non-selectively, by components of a gas mixture.

Methods of determining the volume faction of open mesopores and macropores can be found in co-pending U.S. Provisional Patent Application No. 60/930,827, filed May 18, 2007, which is incorporated herein by reference. Contactors having low volume fraction of open mesopores and macropores can be used in both equilibrium and kinetically controlled swing adsorption processes to improve light component product recovery. Adsorbent contactors of the prior art contain significant levels of mesopores and macropores. At the end of the adsorption step, the mesopores and macropores of such contactors, which are non-selective, will contain significant amounts of light components because transport into the mesopores and macropores is nonselective. This presents an especially significant problem in high pressure thermal wave processes because at the end of the adsorption step the number of molecules in the mesopore and macropore spaces can be comparable to the number of molecules selectively adsorbed in the micropores of the adsorbent. In the desorption step, most of the light components contained in the mesopores and macropores are undesirably lost to the heavy component product stream. As such, these light molecules are not recovered as desired with the light product. This can result in significant loss of valuable light product. The adsorbent contactors and processes herein of the present invention can significantly improve this recovery of light products when they a fabricated with a reduced volume fraction of open mesopore and macropore spaces.

Improvements in the recovery of the light component are especially important for processes used to remove impurities from natural gas streams, particularly high pressure natural gas streams. It is desirable to recover the impurities (heavy components) and the methane-rich product (light component) streams at as high a pressure as practical for operability in natural gas processing. As previously mentioned, the present invention can be used to obtain methane recovery of greater than about 80 mol %, more preferably greater than about 85 mol %, even more preferably greater than about 90 mol %, and most preferably greater than about 95 mol %, even when the natural gas is fed at high pressures, such as at pressures greater than about 50 psig, or even at pressures greater than about 150 psig, or even greater than about 450 psig or 1200 psig. The present invention can be used even when the gas stream is at an exceptionally high pressure of up to about 7000 psig. The composition of natural gas streams directly from an underground field (raw natural gas) will vary from field to field. Non-limiting examples of components that comprise a raw natural gas stream include water, condensates (higher molecular weight organics), methane, ethane, propane, butane, $CO_2$, $N_2$, He, $H_2S$, Hg, and mercaptans. Water and condensates are typically removed and the condensates sent to a petroleum refinery. In order to produce a gas that can be introduced into a pipeline for sale to residential and commercial fuel markets contaminants, such as $N_2$, Hg, mercaptans, and the acid gases $CO_2$ and $H_2S$ must to removed to acceptable levels. The levels and impurity types vary from gas field to gas field and in some cases can comprise the majority of molecules in the produced gas. For example, it is typical for some natural gas fields to contain from about 5 mol % to about 90 mol % $CO_2$, more typically from about 10 mol % to about 70 mol % $CO_2$.

In one embodiment of the present application, in which $CO_2$ is removed from natural gas in swing adsorption processes, it is preferred to formulate the adsorbent with a specific class of 8-ring zeolite materials that has a high kinetic selectivity. The kinetic selectivity of this class of 8-ring zeolite materials allows $CO_2$ to be rapidly transmitted into zeolite crystals while hindering the transport of methane so that it is possible to selectively separate $CO_2$ from a mixture of $CO_2$ and methane. For the removal of $CO_2$ from natural gas, this specific class of 8-ring zeolite materials has a Si/Al molar ratio from about 2 to about 1,000, preferably from about 10 to about 500, and more preferably from about 50 to about 300. It should be noted that as used herein, the term Si/Al is defined as the molar ratio of silica to alumina of the zeolitic structure. This preferred class of 8-ring zeolites that are suitable for use herein allow $CO_2$ to access the internal pore structure through 8-ring windows in a manner such that the ratio of single component diffusion coefficients of $CO_2$ and methane (i.e., $D_{CO2}/D_{CH4}$) is greater than about 10, preferably greater than about 50, and more preferably greater than about 100 and even more preferably greater than about 200. Methods of determining the kinetic selectivity, adsorption isotherms and diffusion coefficients can be found in co-pending U.S. Provisional Patent Application No. 60/930,827, filed May 18, 2007, which is incorporated herein by reference.

In many instances, nitrogen also has to be removed from natural gas or gas associated with the production of oil. In some cases this is because of the high nitrogen levels (>2%) in the produced gas, and in other cases nitrogen removal is needed in order to liquefy natural gas. It may also be advantageous to separate nitrogen from flash gas that occurs in LNG production so that the methane and hydrocarbon products can be used as fuel. Another application is the purification of gas from LNG boil-off so that the methane and hydrocarbon products can be recovered or used as fuel. When recovered, it may be advantageous to re-liquefy the methane and hydrocarbon and returned them back to the LNG cargo. In all of these applications it is desirable to selectively adsorb the nitrogen to obtain high recovery of a purified methane product from nitrogen-containing gas. There have been very few molecular sieve sorbents with significant equilibrium or kinetic selectivity for nitrogen separation from methane. For $N_2$ separation from natural gas it is also preferred to formulate the adsorbent with a class of 8-ring zeolite materials that has a high kinetic selectivity. The kinetic selectivity of this class of 8-ring materials allows $N_2$ to be rapidly transmitted into zeolite crystals while hindering the transport of methane so that it is possible to selectively separate $N_2$ from a mixture of $N_2$ and methane. For the removal of $N_2$, from natural gas, this specific class of 8-ring zeolite materials also has a Si/Al molar ratio from about 2 to about 1,000, preferably from about 10 to about 500, and more preferably from about 50 to about 300. This preferred class of 8-ring zeolites that are suitable for use herein allow $N_2$ to access the internal pore structure through 8-ring windows in a manner such that the ratio of single component diffusion coefficients of $N_2$ and methane (i.e., $D_{N2}/D_{CH4}$) is greater than 5, preferably greater than about 20, and more preferably greater than about 50 and even more preferably greater than 100. Resistance to fouling in swing adsorption processes during the removal $N_2$ from natural gas is another advantage offered by this class of 8-ring zeolite materials.

In other instances, it is also desirable to remove $H_2S$ from natural gas which can contain from about 0.001 mol % $H_2S$ to about 70 mol % $H_2S$. In this case, it can be advantageous to formulate the adsorbent with stannosilicates as well as the aforementioned class of 8-ring zeolites that has kinetic selectivity. The kinetic selectivity of this class of 8-ring materials allows $H_2S$ to be rapidly transmitted into zeolite crystals while hindering the transport of methane so that it is possible to selectively separate $H_2S$ from a mixture of $H_2S$ and methane. For the removal of $H_2S$, from natural gas, this specific class of 8-ring zeolite materials has a Si/Al molar ratio from about 2 to about 1,000, preferably from about 10 to about 500, and more preferably from about 50 to about 300. This preferred class of 8-ring zeolites that are suitable for use herein allow $H_2S$ to access the internal pore structure through 8-ring windows in a manner such that the ratio of single component diffusion coefficients of $H_2S$ and methane (i.e., $D_{H2S}/D_{CH4}$) is greater than about 5, preferably greater than about 20, and more preferably greater than about 50 and even more preferably greater than about 100. DDR, Sigma-1, and ZSM-58 are also suitable for the removal of $H_2S$ from natural gas. In some applications the $H_2S$ has to be removed to the ppm or sub ppm levels. To achieve such extensive removal of $H_2S$ it can be advantageous to use a thermal wave separation process.

It is sometimes necessary to remove heavy hydrocarbons, as previously defined, from natural gas or gas associated with the production of oil. Heavy hydrocarbon removal may be necessary for dew point conditioning before the natural gas is shipped via pipeline or to condition natural gas before it is liquefied. In other instances it may be advantageous to recover heavy hydrocarbons from produced gas in enhanced oil recovery (EOR) floods that employ $CO_2$ and nitrogen. In still other instances it may be advantageous to recover heavy hydrocarbons from associated gas that is cycled back into an oil reservoir during some types of oil production. In many instances where it is desirable to recover heavy hydrocarbons, the gas can be at pressures in excess of about 1,000 psi and in some instances the gas pressure can be in excess of about 5,000 psig, even sometimes in excess of about 7,000 psig. It is advantageous in these applications to use an adsorbent formulated with a zeolite having a pore size between about 5 and about 20 angstroms. Non-limiting examples of zeolites having pores in this size range are MFI, MTW, faujasite, MCM-41 and Beta. It is preferred that the Si/Al molar ratio of zeolites utilized in an embodiment of a process of the present invention for heavy hydrocarbon removal be from about 20 to about 1,000, preferably from about 200 to about 1,000 in order to prevent excessive fouling of the adsorbent.

In some instances, natural gas is produced with mercaptans present and it is advantageous to use adsorption processes to aid in their separation. Streams containing mercaptans and components found in natural gas are present in several processes that have been developed to purify natural gas. It is possible to more selectively separate mercaptans from natural gas or natural gas components and increase the recovery of the valuable components (such as methane) using the contactors of the present invention. It is advantageous in these applications to also use an adsorbent formulated with a zeolite having a pore size between about 5 and about 20 angstroms. Non-limiting examples of zeolites having pores in this size range are MFI, faujasite, MCM-41 and Beta. In these applications the Si/Al molar ratio of the zeolite can be from about 1 to about 1,000.

The present invention can be applied to improve the separation of molecular species from synthesis gas. Synthesis gas can be produced by a wide variety of methods, including steam reforming of hydrocarbons, thermal and catalytic partial oxidation of hydrocarbons, and many other processes and combinations known in the art. Synthesis gas is used in a large number of fuel and chemical applications, as well as power applications such as Integrated Gasification Combined Cycle (IGCC). All of these applications have a specification of the exact composition of the syngas required for the process. As produced, synthesis gas contains at least CO and $H_2$. Other molecular components in the gas can be $CH_4$, $CO_2$, $H_2S$, $H_2O$, and $N_2$. Minority (or trace) components in the gas can include hydrocarbons, $NH_3$ and NOx. In almost all applications, most of the $H_2S$ has to be removed from the syngas before it can be used and in many applications it is desirable to remove much of the $CO_2$. In applications where the syngas is used as a feedstock for a chemical synthesis process, it is generally desirable to adjust the $H_2/CO$ ratio to a value that is optimum for the process. In certain fuel applications, a water-gas shift reaction may be employed to shift the syngas almost entirely to $H_2$ and $CO_2$, and in many such applications it is desirable to remove the $CO_2$.

The temperature rise must be limited during the adsorption step for either internally heated or externally heated contactors. For example, the heat of adsorption for $CO_2$ in cationic zeolites is in a range from about 15 to about 40 kilo-joule per mole of $CO_2$ adsorbed. The adiabatic temperature rise for an adsorbent loaded with 1 millimole of $CO_2$ per gram of a cationic zeolite adsorbent would be in a range from about 20° C. to about 50° C. with this heat of adsorption. For internally heated contactors, it is preferred to limit the temperature rise during the adsorption step to less than about 20° C. by incorporating a thermal mass. Any suitable material can be used as the thermal mass material in the practice of the present invention. Non-limiting examples of such materials include metals, ceramics, and polymers. Non-limiting examples of preferred metals include steel alloys, and aluminum. Non-limiting examples of preferred ceramics include silica, alumina, and zirconia. Polyimides are preferred polymers that can be used as thermal masses in the practice of the present invention. Depending upon the degree to which the temperature rise is to be limited during the adsorption step, the amount of thermal mass material used can range from about 0.1 to about 25 times the mass of the microporous adsorbent of the contactor. A preferred range for the amount of thermal mass in the contactor is from about 0.1 to 5 times the mass of the microporous adsorbent of the contactor. A more preferred range for the amount of thermal mass material will be from about 0.1 to about 2 times the mass of the microporous adsorbent material, most preferably from about 0.1 to about 1 times the mass of the microporous material of the contactor. For externally heated contactors, the temperature rise during the adsorption step is preferably limited to less than about 20° C. by pumping a cooling fluid through the heating/cooling channels or passages in the contactor. In one preferred embodiment, the cooling fluid is water. In such a case, the thermal energy taken up by the water flow used to cool the contactor can be dissipated with use of a cooling tower. In another embodiment, the cooling fluid is a fluid (gas or liquid) that is flowing through a refrigeration cycle. In still another embodiment, the contactor is cooled with product effluent that has the target components removed. For example, in flue gas separation, this product effluent is the gas that has passed through the contactor that removes target components such as $CO_2$ and optionally water. In such a case, the effluent is passed through the heating/cooling channels of the contactor in a direction that is counter-current to the direction of flow of flue gas being processed to remove $CO_2$. For externally heated contactors, it is also possible to use a thermal mass to limit the temperature rise during the adsorption step to less than 20° C. If a thermal mass is used with an externally heated contactor the ratio of thermal mass to adsorbent mass can be in a range from about 0.02 to about 2 and preferably in a range from about 0.1 to about 1.

The dimensions and geometric shapes of the parallel channel contactors of the present invention can be any dimension or geometric shape that is suitable for use in a TSA or thermal wave swing adsorption process. Non-limiting examples of geometric shapes include various shaped monoliths having a plurality of substantially parallel channels extending from one end of the monolith to the other; a plurality of tubular members; stacked layers of adsorbent sheets with and without spacers between each sheet; multi-layered spiral rolls, bundles of hollow fibers, as well as bundles of substantially parallel solid fibers. The adsorbent can be coated onto these geometric shapes or the shapes can be formed directly from the adsorbent material. An example of a geometric shape formed directly from the adsorbent would be the extrusion of a zeolite/polymer composite into a monolith. Another example of a geometric shape formed directly from the adsorbent would be extruded or spun hollow fibers made from a zeolite/polymer composite. An example of a geometric shape that is coated with the adsorbent would be a thin flat steel sheet that is coated with a microporous, low mesopore, adsorbent film, such as a zeolite film. The directly formed or coated adsorbent layer can be itself structured into multiple layers or the same or different adsorbent materials. Multi-layered adsorbent sheet structures are taught in United States Patent Application Publication No. 2006/0169142, which is incorporated herein by reference.

The substantially parallel channels in internally heated parallel channel contactors are sometimes referred to as "flow channels" or "gas flow channels". Generally, flow channels provide for relatively low fluid resistance coupled with relatively high surface area. The channels are preferably configured to minimize pressure drop in the channels. In many embodiments, a fluid flow fraction entering a channel at the inlet of the contactor does not communicate with any other fluid fraction entering another channel at its inlet until the fractions recombine after exiting at the outlet. It is important that there be channel uniformity to ensure that substantially all of the channels are being fully utilized, and that the mass transfer zone is substantially equally contained. If there is excessive channel inconsistency, then productivity and gas purity will suffer. If one flow channel is larger than an adjacent flow channel, then premature product break-through, can lead to a reduction in the purity of the desired product gas. Moreover, devices operating at cycle frequencies greater than about 0.1 per minute (cpm) require greater flow channel uniformity and less pressure drop than those operating at lower cycles per minute. Further, if too much pressure drop occurs across the bed, then higher cycle frequencies are not readily achieved.

The dimensions of the flow channels can be computed from considerations of pressure drop along the flow channel. It is preferred that the flow channels have a channel gap from about 5 to about 1,000 microns, preferably from about 50 to about 250 microns. Typically, flow channel lengths range from about 0.5 centimeter to 30 meter, more typically from about 10 cm to about 10 meter and a have channel gaps of about 50 to about 250 microns. The channels may contain a spacer, or mesh, that acts as a spacer. As utilized herein, the "channel gap" of a flow channel is defined as the length of a line across the minimum dimension of the flow channel as viewed orthogonal to the flow path. For instance, if the flow channel is circular in cross-section, then the channel gap is the internal diameter of the circle. However, if the channel gap is rectangular in cross-section, the flow gap is the distance of a line perpendicular to and connecting the two longest sides of the rectangular (i.e., the length of the smallest side of the rectangle). It should also be noted that the flow channels can be of any cross-sectional configuration. Preferred embodiments are wherein the flow channel cross-sectional configuration is either circular, rectangular or square. However, any geometric cross-sectional configuration may be used, such as but not limited to, ellipses, ovals, triangles, or various polygonal shapes. In other preferred embodiments, the ratio of the adsorbent volume to flow channel volume in the adsorbent contactor is from about 0.5:1 to about 100:1, and more preferably from about 1:1 to about 50:1.

In some applications, the channels can be formed when adsorbent sheets are laminated together. For laminated adsorbents, spacers can be used which are structures or material, that define a separation between adsorbent laminates. Non-limiting examples of the type of spacers that can be used in the present invention are those comprised of dimensionally accurate: plastic, metal, glass, or carbon mesh; plastic film or metal foil; plastic, metal, glass, ceramic, or carbon fibers and threads; ceramic pillars; plastic, glass, ceramic, or metal spheres, or disks; or combinations thereof.

In a structured adsorbent contactor, most of the $CO_2$ selective adsorbent and optionally the water selective adsorbent material are incorporated as part of the wall of the flow channel. The structured adsorbent contactor may optionally contain a thermal mass to control heating during the adsorption step of the swing adsorption process. Heating during the adsorption step is caused by the heat of adsorption of molecules entering the adsorbent. The thermal mass that limits temperature rise during the adsorption step can be incorporated into the flow channel of the contactor or incorporated into the wall along with the $CO_2$ selective or optional water selective adsorbent. When it is incorporated into the wall it can be a solid material distributed throughout the adsorbent layer or be included as a separate layer.

The overall adsorption rate of the swing adsorption processes is characterized by the mass transfer rate from the flow channel into the adsorbent. It is desirable to have the mass transfer rate of the species being removed (i.e., the heavy component) high enough so that most of the volume of the adsorbent is utilized in the process. Since the adsorbent selectively removes the heavy component from the gas stream, inefficient use of the adsorbent layer can lower recovery of the light component and/or decrease the purity of the light product stream. With use of the present invention, it is possible to formulate an adsorbent with a low volume fraction of meso and macroporous such that most of the volume of the adsorbent, which will be in the microporous range, is efficiently used in the adsorption and desorption of the heavy component. One way of doing this is to have an adsorbent of substantially uniform thickness where the thickness of the adsorbent layer is set by the mass transfer coefficients of the heavy component and the time of the adsorption and desorption steps of the process. The thickness uniformity can be assessed from measurements of the thickness of the adsorbent or from the way in which it is fabricated. It is preferred that the uniformity of the adsorbent be such that the standard deviation of its thickness is less than about 25% of the average thickness. More preferably, the standard deviation of the thickness of the adsorbent is less than about 15% of the average thickness. It is even more preferred that the standard deviation of the adsorbent thickness be less than about 5% of the average thickness.

A figure of merit for the mass transfer through the adsorbent layer is a time constant, $\tau_a$, for transport of the heavy component computed at each point in the adsorbent. For a planar adsorbent sheet with thickness in the x direction, and the y and z directions being in the plane of the sheet, the time constant, $\tau_a$, of the heavy component is $$\tau_a[x,y,z] = \text{Minimum}[L_{path}^2/D_{path}] \text{ (in seconds)}$$

where $D_{path}$ is the average transport diffusion coefficient of the heavy component along a path from the feed channel to the point (x,y,z) and $L_{path}$ is the distance along the path. There are many possible trajectories or paths from the feed channel to each point (x,y,z) in the adsorbent. The time constant is the minimum of the possible time constants ($L_{path}^2/D_{path}$) along all possible paths from the feed channel to the (x,y,z) point in the adsorbent. This includes paths through meso and macropores. If there is a solid material in the adsorbent (such as that which may be included for heat management) there will be no transport within it and (x,y,z) points within it are not included in the computation. The transport diffusion coefficient of each species is taken to be the single component Stefan-Maxwell diffusion coefficient for each species. The average transport diffusion coefficient along the path, $D_{path}$, is the linearly averaged diffusion coefficient along the path. A linear averaging is sufficient to provide a diffusion coefficient characterizing the path. When the heavy component has many species the diffusion coefficient, $D_{path}$, is also compositionally averaged. The diffusion coefficient depends on temperature and it may depend on pressure as well. To the extent that the diffusion coefficient changes, it must be averaged for the temperature and pressure changes occurring during a cycle. For an adsorbent to be efficient, the averaged thickness of the adsorbent layer preferably is chosen such that the time constant for at least half the points (or volume) in the adsorbent that is not a dense solid is less than the cycle time of the process. More preferably, the average thickness of the adsorbent layer is chosen such that the time constant for at least about 75% of the points (or volume) in the adsorbent that is not a dense solid is less than the cycle time of the process. Even more preferably the average thickness of the adsorbent layer is chosen such that the time constant for at least about 75% of the points (or volume) in the adsorbent that is not a dense solid is less than about 25% of the cycle time of the process.

With a contactor that has good mass transfer characteristics and has a means to limit the temperature rise when a target component is adsorbed, a sharp concentration front of the adsorbed target component moves along the length of the contactor during the adsorption step of the TSA cycle. Near the beginning of the adsorption step, process gas (for example flue gas) begins to flow through the contactor and the target component (for example $CO_2$ in the case of flue gas separations) is adsorbed in the adsorbent material nearest to the entrance of the contactor. This depletes the target component (for example $CO_2$) from the flowing gas stream that passes along the length of the contactor. The concentration of the adsorbed target component falls precipitously at some point along the contactor to approximately the level left at the end of the regeneration step. The position at which the adsorbed target component concentration falls, moves along the length of the contactor towards the exit as the adsorption step continues. This movement is referred to as an adsorbed concentration wave that moves along the length of the contactor. A sharp concentration front, or gradient, in adsorbed concentration along the length of the contactor is preferred because it enables the feed to be passed through the contactor for a relatively long time before "breakthrough" of the adsorbate occurs.

If mass transfer is not adequate, then the gradient will be shallow. Such a condition results in adsorbate beginning to escape the contactor long before the contactor's capacity to adsorb is well utilized. In practice, high mass transfer is achieved by providing relatively small channels for the feed fluids to travel through. This is accomplished using contactors with small flow passages or channels for gas flow.

When the adsorption front, or wave, breaks through (or prior to break through) at the exit of the contactor, the adsorption step is stopped and regeneration is initiated. To regenerate the contactor the adsorbent is heated. In a preferred embodiment for flue gas separation, part of the heat used to regenerate the adsorbent comes from interstage cooling of the compressors used to compress the captured $CO_2$ to pressures greater than about 1,000 psi for transmission via pipeline or sequestration. Another source of heat that can be used to regenerate the contactor is low or medium grade waste process heat that is often discarded in industrial processes.

Heat is supplied to regenerate the contactor by passing a hot fluid (gas or liquid) counter-currently, co-currently, or cross-flow to the direction that the process gas flows during the adsorption step. In one embodiment, individual segments of a cross-flow contactor are stacked or arranged so that the average flow of the thermal fluid (or "heat transfer fluid") during regeneration is counter-current or co-current to the average direction of flow of process gas (for example, flue gas) during the adsorption step.

Because of the way the isotherm changes when the adsorbent heats-up, a target component (for example $CO_2$ in the case of flue gas separation) is released and the adsorbent regenerates. It is preferred to cool the contactor that has been regenerated at the end of the regeneration step and to transfer as much heat from the contactor that has finished regenerating to heat another contactor so that it can be regenerated. This is accomplished by routing thermal fluid (gas or liquid) that has been passed through the contactor that has been regenerated into a contactor that is beginning the regeneration step. To cool the contactor that has been regenerated, a thermal fluid is introduced into the contactor that has been regenerated at a temperature at least about 25° C. lower than the average temperature of the contactor at the end of the regeneration step and preferably at least about 50° C. lower than the average temperature of the contactor at the end of the regeneration step. This thermal fluid heats up as it passes through the contactor and this heated thermal fluid (or "heat transfer fluid") is then directed to transfer heat to another contactor. In a preferred embodiment at least about 20% of the sensible heat given up in cooling the contactor to transition from the end of a regeneration step to the start of an adsorption step is transferred to another adsorbent contactor in the process, and in a more preferred embodiment at least about 50% of the sensible heat given up in cooling the contactor to transition from the end of a regeneration step to the start of an adsorption step is transferred to another adsorbent contactor in the process.

During the regeneration process it is preferred to heat the contactor co-currently or counter-currently to the direction the flue gas flowed during the adsorption step. Heating is accomplished by flowing a hot fluid (or "heat transfer fluid") through the contactor. For a directly heated contactor the heat transfer fluid passes through the same flow channels that were used in the adsorption process. This heat transfer fluid can be either a gas or liquid. Preferred liquids include water and steam that can be separated from the target components by condensation. A preferred heat transfer fluid is comprised of recycled target components that are heated by flowing through a heat exchanger or another hot contactor before being introduced into the contactor being regenerated. The heat exchanger used to heat the recycled target component can be an indirect heat exchanger such as a shell and tube heat exchanger or a direct heat exchanger such as a cyclic bed heat exchanger. For an indirectly heated contactor the heat transfer fluid passes through different flow channels from those used in the adsorption step of the process. These heating/cooling flow channels in indirectly heated contactors are isolated from those used to conduct flue gas to the adsorbent. For indirectly heated contactors, heat transfer fluid flowed through the heating/cooling channels can either be a gas such as ammonia, a fluorocarbon, or recycled or reheated target component or a fluid such as water or oil. In all cases, it is desired that the temperature of the heat transfer fluid used to heat the contactor be at least about 25° C. higher than the average temperature of the adsorbent contactor during the adsorption step and preferably the temperature of the heat transfer fluid is at least about 50° C. higher than the average temperature of the adsorbent contactor during the adsorption step.

Preferred embodiments of the adsorbent contactors utilized in the present invention can better be understood with reference to the Figures hereof. FIG. 1 hereof is a representation of a parallel channel contactor of the present invention in the form of a monolith formed directly from a microporous adsorbent plus binder and containing a plurality of parallel flow channels. A wide variety of monolith shapes can be formed directly by extrusion processes. An example of a cylindrical monolith 1 is shown schematically in FIG. 1 hereof. The cylindrical monolith 1 contains a plurality of parallel flow channels 3. These flow channels 3 can have channel gaps from about 5 to about 1,000 microns, preferably from about 50 to about 250 microns, as long as all channels of a given contactor have substantially the same size channel gap. The channels can be formed having a variety of shapes including, but not limited to, round, square, triangular, and hexagonal. The space between the channels is occupied by the adsorbent 5. As shown the channels 3 occupy about 25% of the volume of the monolith and the adsorbent 5 occupies about 75% of the volume of the monolith. The adsorbent 5 can occupy from about 50% to about 98% of the volume of the monolith. The effective thickness of the adsorbent can be defined from the volume fractions occupied by the adsorbent 5 and channel structure as:

$$\text{Effective Thickness Of Adsorbent} = \frac{1}{2} \text{Channel Diameter} \frac{\text{Volume Fraction Of Adsorbent}}{\text{Volume Fraction Of Channels}}$$

Figure 2:
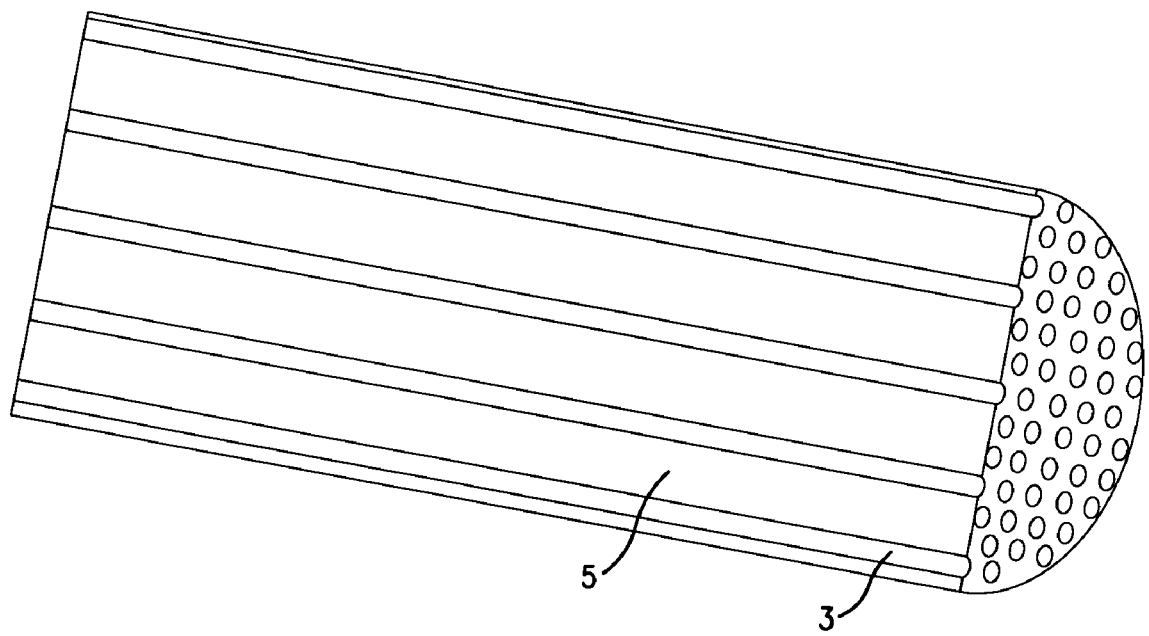
FIG. 2 hereof is a cross-sectional representation along the longitudinal axis of the monolith of FIG. 1.
Figure 3:
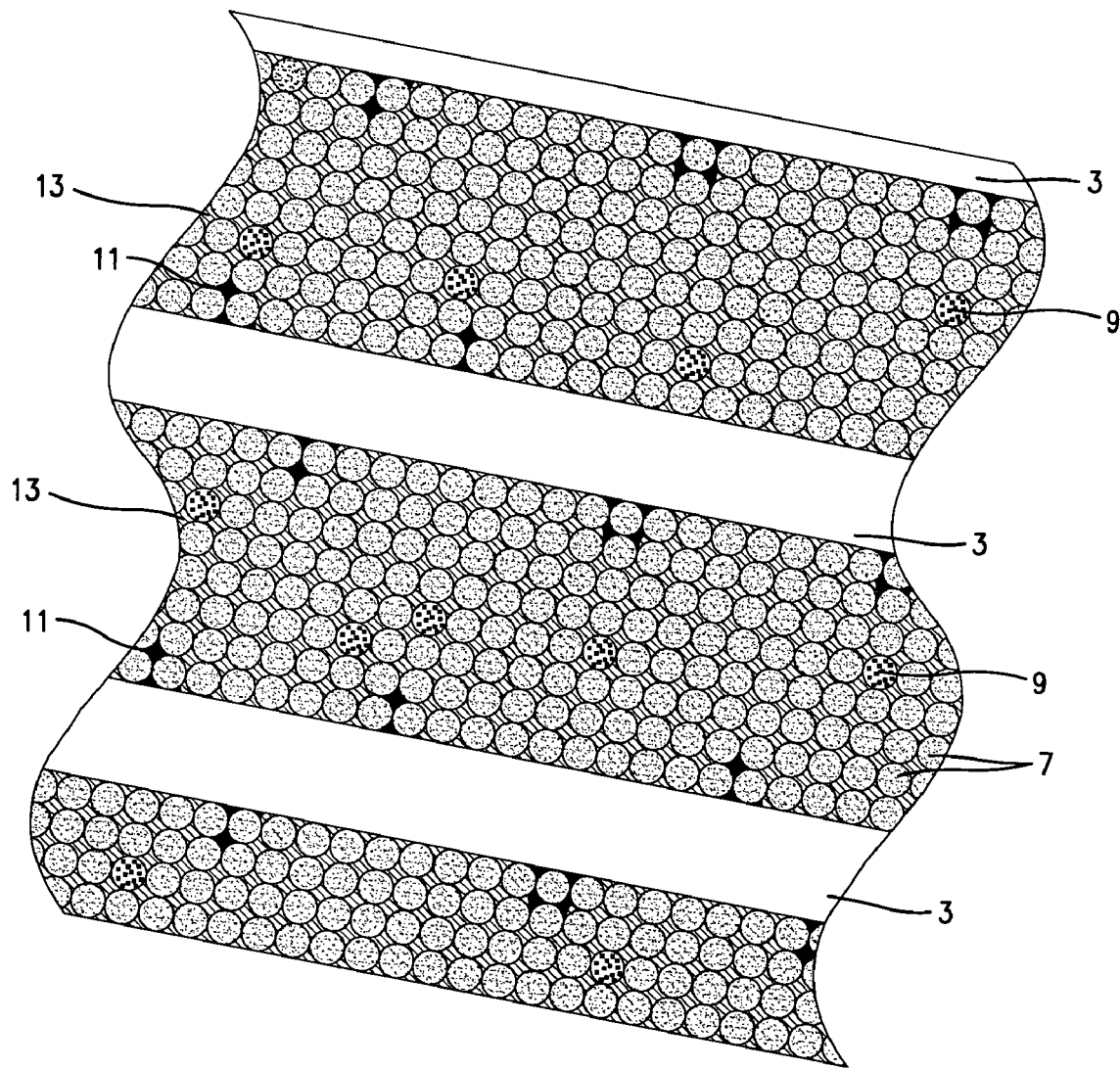
FIG. 3 hereof is a representation of a magnified section of the cross-sectional view of the monolith of FIG. 2 showing the detailed structure of the adsorbent layer along with a blocking agent occupying some of the meso and macropores.

For the monolithic parallel channel contactor of FIG. 1 that is internally heated during regeneration, it is preferred that the effective thickness of the adsorbent will be about 1.5 times the diameter of the feed channel. FIG. 2 is a cross-sectional view along the longitudinal axis of the contactor of FIG. 1 hereof showing feed channels 3 extending through the length of the monolith with the walls of the flow channels formed entirely from adsorbent 5. A schematic diagram enlarging a small cross section of adsorbent layer 5 is shown in FIG. 3 hereof. The adsorbent layer 5 is comprised of a microporous adsorbent, or polymeric, particles 7; solid particles (thermal mass) 9; that act as heat sinks, a blocking agent 13 and open mesopores and micropores 11. As shown, the microporous adsorbent or polymeric particles 7 occupy about 60% of the volume of the adsorbent layer and the solid particles 9 occupy about 5% of the volume. With this composition, the voidage (flow channels) is about 55% of the volume occupied by the microporous adsorbent or polymeric particles. The volume of the microporous adsorbent 5 or polymeric particles 7 can range from about 25% of the volume of the adsorbent layer to about 98% of the volume of the adsorbent layer. In practice, the volume fraction of solid particles 9 used to control heat will range from about 0% to about 75% of the volume of the adsorbent layer. In a preferred embodiment the total volume of the mesopores and macropores in the contactor is minimized. One method to minimize the total mesopore and macropore volume is with a blocking agent 13 that fills the desired amount of space or voids left between particles so that the volume fraction of open mesopores and micropores 11 in the adsorbent layer 5 is less than about 20%.

When the monolith is used in a gas separation process that relies on a kinetic separation (predominantly diffusion controlled) it is advantageous for the microporous adsorbent or polymeric particles 7 to be substantially the same size. It is preferred that the standard deviation of the volume of the individual microporous adsorbent or polymeric particles 7 be less than 100% of the average particle volume for kinetically controlled processes. In a more preferred embodiment the standard deviation of the volume of the individual microporous adsorbent or polymeric particles 7 is less than about 50% of the average particle volume. The particle size distribution for zeolite adsorbents can be controlled by the method used to synthesize the particles. It is also possible to separate pre-synthesized microporous adsorbent particles by size using methods such as a gravitational settling column. It may also be advantageous to use uniformly sized microporous adsorbent or polymeric particles in equilibrium controlled separations.

There are several ways that monoliths can be formed directly from a structured microporous adsorbent. Such methods are described in co-pending U.S. Provisional Patent Application No. 60/930,827, filed May 18, 2007, which is incorporated herein by reference.

Figure 4:
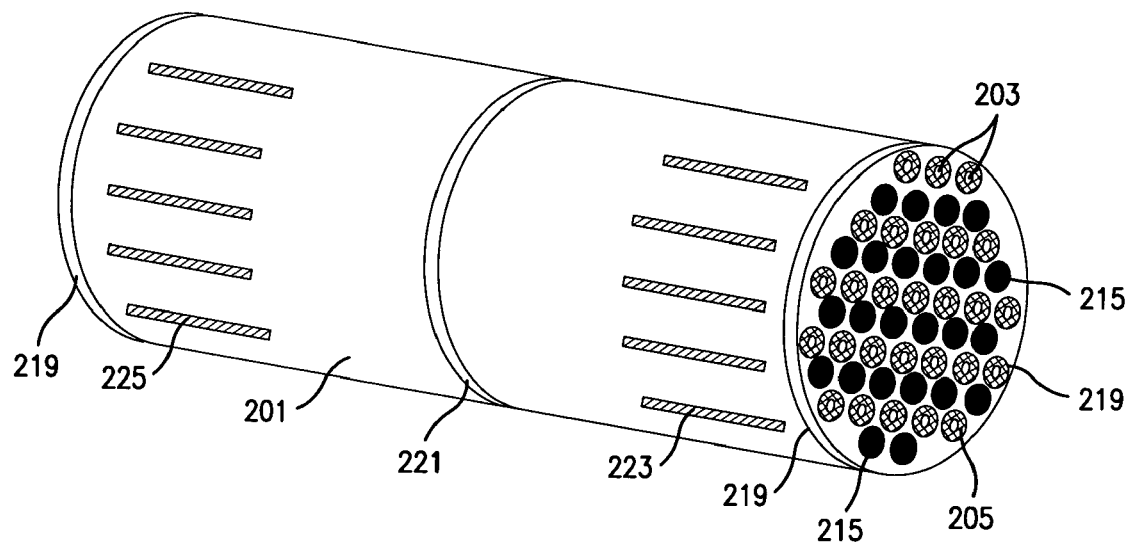
FIG. 4 hereof represents another embodiment of the present invention in which the parallel channel contactor is in the form of a coated monolith for TSA applications where the adsorbent layer is coated onto the channel walls of a preformed monolith. This figure shows separate rows of feed channels and separate rows of heating/cooling channels.

A non-limiting example of a parallel channel contactor that is externally heated during regeneration is shown in FIG. 4 hereof. FIG. 4 hereof is a representation of a parallel channel contactor of the present invention in the form of a coated monolith 201 that is externally heated during regeneration when the adsorbent layer is coated onto the channel of a preformed monolith comprised of non-adsorbent material. In this example, an extrusion process is used to form a monolith from a suitable non-adsorbent material including a metal such as steel, or a ceramic such as cordurite, zeolite or a carbon. A ceramic or metallic glaze or sol gel coating 219 is applied to seal the channel walls of the monolith. Such glazes can be applied by slurry coating the channel walls followed by curing by firing. A sol gel can also be applied to the channel walls and then fired under conditions that densify the coating. It is also possible to use vacuum and pressure impregnation techniques to apply the glaze or sol gel. In this case, the glaze or sol gel will penetrate into the pore structure of the monolith 217. In all cases the glaze seals the wall of the channel such that gas flowing thorough the channel is not readily transmitted into the body of the monolith. It may also be desirable to impregnate the pore structure of the monolith 217 with a solid material before the channel walls are sealed. In order to provide externally heating in TSA operation, alternate rows of channels are sealed at their ends 215. At the opposite end of the monolith these same rows of channels are also sealed. Slots (223 and 225) are cut through the monolith at both ends of the monolith to provide flow access to these sealed rows of channels 215. Sealing surfaces 219 are provided at both ends of the monolith as well as in the middle of the monolith 221.

In operation, the monolith will be mounted in a module in a manner that seals the ends of the channels as well as the middle of the monolith. Any suitable technology can be used to seal the ends of the channels including metallic welds, gasketing with materials such as rubbers or carbons, and the use of adhesives such as inorganic cements and epoxies. The module is configured so that a heating or cooling fluid can be flowed through the channels sealed at the ends 215 by introducing it though the slots 223 and removing it through slots 225. The heating and cooling fluid will undergo heat exchange with fluid flowing through the channels that are open at the end of the module. These modifications to the monolith convert it into a heat exchanger and there are various other ways in which heat exchangers can be produced or configured. Non-limiting examples of such other ways include shell and tube heat exchangers, fiber film heat exchangers and printed circuit heat exchangers, all of which are well known in the art. By coating an adsorbent layer on one side of a heat exchanger it can be used in accordance with the present invention. In a preferred embodiment the adsorbent layer has a low volume fraction of meso and macropores. As such, this example illustrates how monolithic heat exchanger structures can be converted into modules suitable for externally heated TSA operation. Feed channels 203 can have diameters (channel gaps) and adsorbent layer thicknesses as previously mentioned with regard to FIG. 1 hereof.

The adsorbent layer 205 can be applied as a coating, or layer on the walls of the flow channels by any suitable method. Non-limiting examples of such methods include fluid phase coating techniques, such as slurry coating, slip coating, hydrothermal film formation, hydrothermal coating conversion, and hydrothermal growth. When non-hydrothermal coating techniques are used, the coating solutions should include at least the microporous adsorbent or polymeric particles, a viscosifying agent such as polyvinyl alcohol, heat transfer solids, and optionally a binder. The heat transfer solid may not be needed because the body of the monolith 201 can act to as its own heat transfer solid by storing and releasing heat in the different steps of the separation process cycle. In such a case, the heat diffuses through the adsorbent layer 205 and into the body of the monolith. If a viscosifying agent, such as polyvinyl alcohol, is used it is usually burns away when the coating is cured in a kiln. It can be advantageous to employ a binder such as colloidal silica or alumina to increase the mechanical strength of the fired coating. Mesopores or macropores will typically occupy from about 20 to about 40% of the volume of the cured coating. To reduce macropore and mesopore volume, a blocking agent can be applied in a separate coating process. When hydrothermal film formation methods are chosen to apply the adsorbent layer, the coating techniques used can be very similar to the way in which zeolite membranes are prepared. An example of a method for growing a zeolite layer is taught in U.S. Pat. No. 7,049,259, which is incorporated herein by reference. Zeolite layers grown by hydrothermal synthesis on supports often have cracks and grain boundaries that are mesopore and macropore in size. The volume of these pores is often less than about 10 volume % of the film thickness and there is often a characteristic distance, or gap, between cracks. Thus, as-grown films can often be used directly as an adsorbent layer without the need for a blocking agent.

Figure 5:
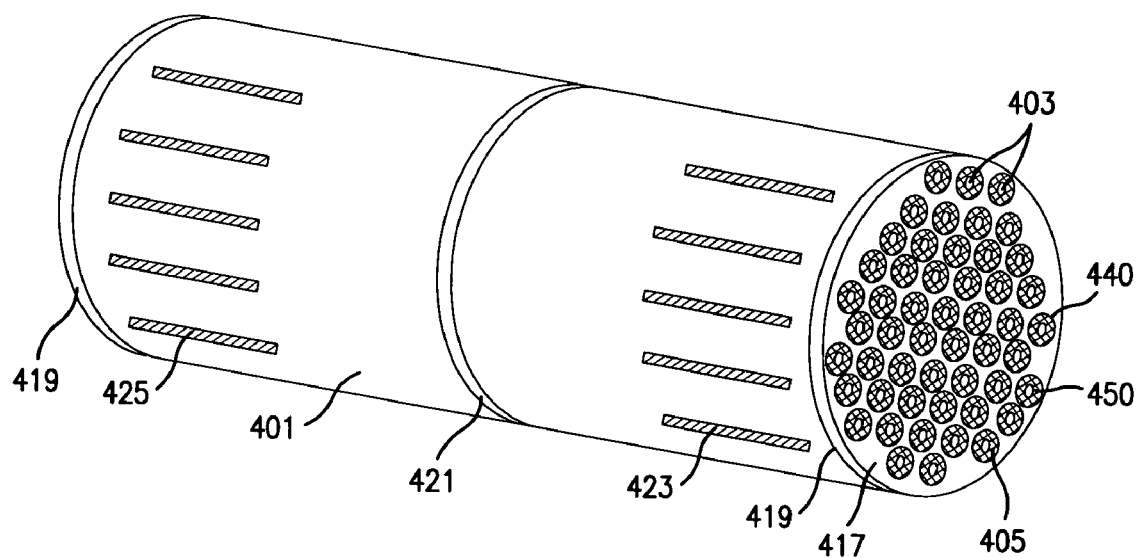
FIG. 5 hereof is yet another representation of a parallel channel contactor of the present invention but in the form of a hollow fiber contactor for TSA applications.
Figure 6:
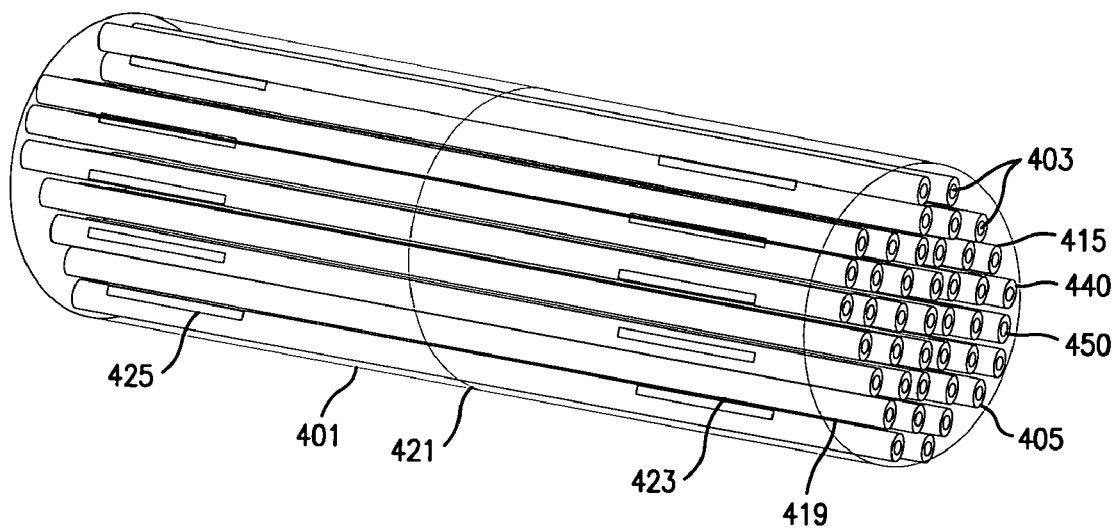
FIG. 6 hereof is another representation of a hollow fiber contactor for TSA applications as shown in FIG. 5 but with the outer surfaces of the housing for the contactor rendered transparent. Dotted lines are used to indicate the edges of the outer surface.

FIGS. 5 and 6 hereof are representations of another parallel channel contactor structure of the present invention that is externally heated during regeneration. In this contactor for an externally heated TSA process the adsorbent layer 405 comprises part of the wall of a hollow fiber 415. In FIG. 6, the outer surfaces of the housing for the contactor 401 are rendered transparent with only dotted lines indicating the edges of the outer surface. The hollow fibers used in this example have a diffusion barrier on either the exterior surface 440 or interior surface 450. If the diffusion barrier is on the interior surface 450 then heating and cooling fluid is passed through the hollow core 403 of the fibers 415 arrayed to form the contactor. If the diffusion barrier is on the exterior surface 440, then the flue or process gas is fed through the hollow core 403.

Many different methods can be used to produce the adsorbent layer 405 in the fiber. Some of these methods are described in co-pending U.S. Provisional Patent Application No. 60/930,827, filed May 18, 2007, which is incorporated herein by reference.

To make the fiber suitable for use in an externally heated TSA process a diffusion barrier is coated onto the inner surface 450 or outer surface 440 of the fiber. Non-limiting examples of materials that can act as diffusion barriers include sputter deposited metal and ceramic films, evaporated metal and ceramic films, metal and ceramic films formed by chemical vapor deposition, coated composites of polymers and solids (such as clays) and coatings of polymers that have low diffusion coefficients. To act as a diffusion barrier, the effective diffusion coefficient of the coating should be less than about $1/10$ the average diffusion coefficient in the adsorbent layer and preferably less than about $1/1000$ the average diffusion coefficient in the adsorbent layer. When a diffusion barrier is used, the gas in the feed channel is effectively contained in the feed channel and adsorbent layer. This can eliminate the need for a supporting matrix around the fibers, thus lowering the mass of the contactor, and in some cases allowing for the cycle time in the process to be decreased (i.e. rapid cycle operation).

Once suitable fibers, or an externally heated parallel channel contactor, have been formed, they are gathered into a bundle and the ends of the fiber bundle are potted or embedded in a matrix material 417. This fixes the fibers into a substantially parallel array. One method to do this is with an embedding or potting process that surrounds the ends of the fibers with a matrix material 417. To visualize the potted fiber array, FIG. 5 shows the parallel channel fiber contactor with the matrix material 417 rendered transparent along with the tubular housing 401.

This potted array is then sealed into a tubular housing 401. Sealing surfaces 419 are provided at the ends of the tubular housing 401. A sealing surface 421 is also provided in the middle of the housing. Slots 423 and 425 are cut through the wall near the ends of the tubular housing to allow for the flow of heating and cooling fluids and or process and product gasses. If the diffusion barrier is on the interior surface 450 flue or process gas flows through the slots 423 and 425. If the diffusion barrier is on the exterior surface 440, then heating and cooling fluid flows through the slots 423 and 425.

In operation, the tubular housing is mounted in a TSA or RCTSA (rapid cycle thermal swing adsorption) module in a manner that seals the ends of the channels as well as the middle of the monolith. As previously discussed, any suitable sealing technology can be used. In a specific example, the module is configured so that a heating or cooling fluid can be flowed inside the hollow tubular housing 401 by introducing it though slots 423 and removing it through slots 425. The heating and cooling fluid will undergo heat exchange with fluid flowing through the hollow fibers which are open at the end of the module. With these sealing arrangements, the tubular housing 401 containing the parallel array of hollow fibers becomes a heat exchanger suitable for use in TSA processes. In a preferred embodiment, the fibers have an adsorbent layer 405 with a low volume fraction of mesopores and macropores.

Several hybridized processes that combine a thermal wave process with either a pressure swing or partial pressure displacement process can be created. A thermal wave process can be combined with pressure swing to make a hybridized thermal wave/pressure swing process that produces a multi-component separation while facilitating the desorption of strongly held species. A thermal wave process can be combined with a partial pressure displacement process to make a hybridized thermal wave/partial pressure displacement process that can be run with liquid feeds.

The present invention can better be understood with reference to the following examples that are presented for illustrative purposes and not to be taken as limiting the invention.

EXAMPLE 1

TSA as practiced has several disadvantages. In directly-heated TSA processes, a hot fluid is typically flowed through the adsorption bed to raise the adsorbent temperature. The greater the temperature rise, the more fluid is needed. The desorbed impurities thus end up dispersed in a large volume of heating fluid, and the large amount of heat that is used to raise the adsorbent temperature is often not recovered. In some cases the heat is not recovered because many directly-heated TSA systems are operated with long adsorption times, sometimes over 24 hours, and much shorter regeneration times. Finally, the occasional and gradual regeneration gives rise to concentration and flow variations in downstream equipment that can be difficult to manage in an otherwise steady state process plant. In indirectly-heated TSA systems, the heat can be supplied with a heat exchanger, avoiding dilution of the product with a heated purge gas. However, heat management and the cyclic nature of indirectly heated TSA processes often presents difficulties.

This example illustrates a TSA system that enables chromatographic-like separation of a multi-component feed into several streams each concentrating different species. This chromatographic-like separation will be referred to as "Temperature Wave Adsorption" (TWA).

Figure 7:
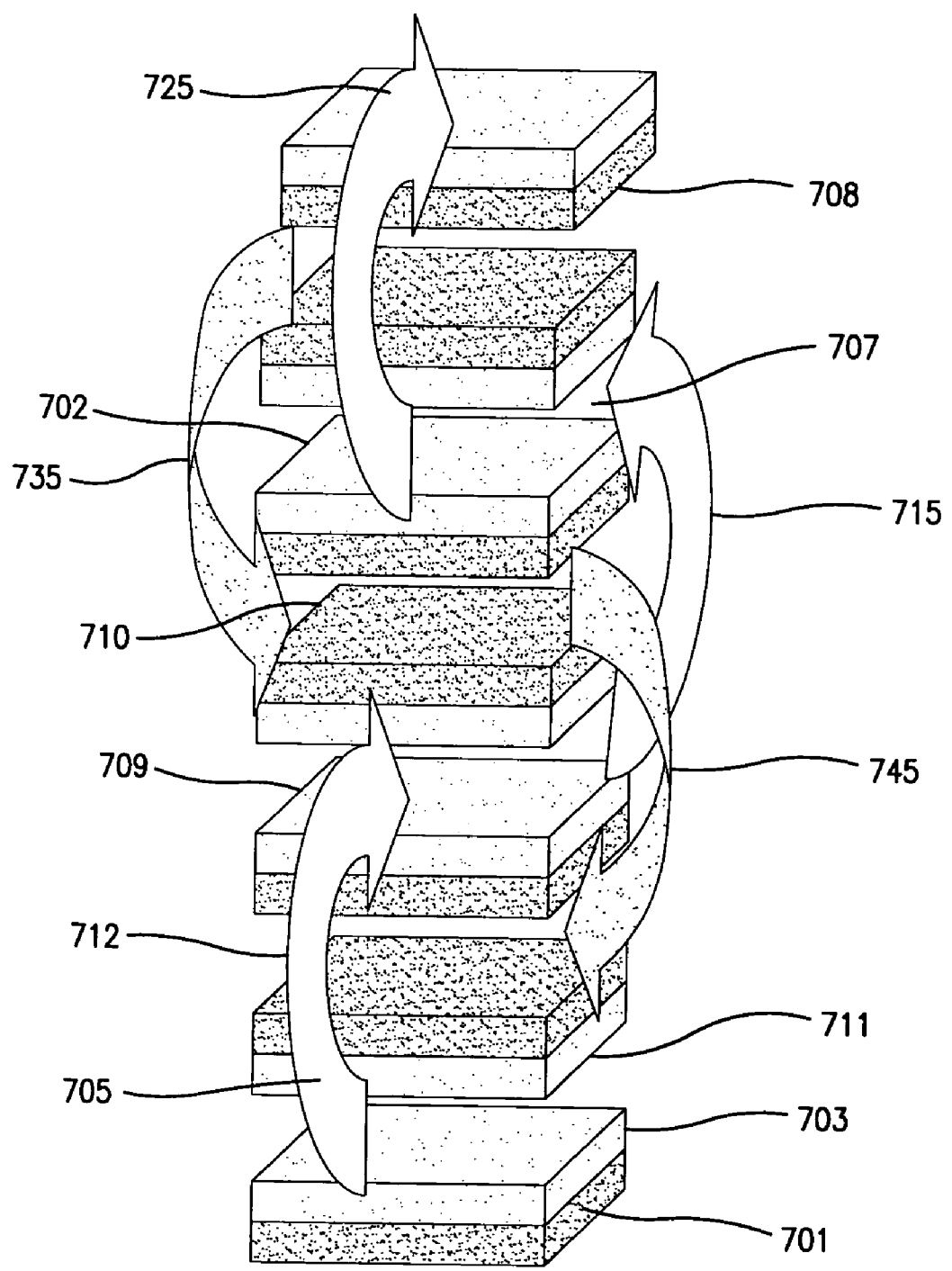
FIG. 7 hereof shows a cut away view of a cross-flow contactor that has segments stacked so that the average flow of fluid during regeneration is countercurrent to the direction of flow during the adsorption step.

The TWA process as disclosed and claimed herein is a specific type TSA process that uses indirect heating (i.e., it does not dilute the desorbed materials into a heating medium). In its simplest embodiment, one set of channels in a contactor contains an adsorbent and another set of channels is used to bring heat into and take heat out of the contactor. In a preferred embodiment, the heat adding/removing channels are designed in a manner that results in a thermal wave moving along the length of the channels in heating and cooling steps of the TSA process. FIGS. 4, 5, 6 and 7 hereof show parallel channel contactor configurations that are suitable for use in this preferred TWA embodiment. In FIG. 4, channels 223 and 225 act as heating/cooling channels and channels 203 act as adsorption channels. In FIGS. 5 and 6, channels 423 and 425 act as heating/cooling channels and channels 403 act as adsorption channels. In FIG. 7, channels connected by 735 and 745 act as heating/cooling channels and channels connected by 705, 715, and 725 act as adsorption channels.

The velocity of the thermal wave and the sharpness of the thermal front. can be determined by recording the time dependence of the temperature of the thermal fluid emerging from the heating/cooling channels. The time delay, before the temperature begins to change, provides a measurement of the velocity of the thermal wave and the rate at which the temperature changes provides a measurement of the sharpness of the front. The needed data can be acquired from a thermocouple placed in the stream emerging from the heat exchange channels. One way to characterize the velocity of the thermal front is to measure $t_{delay}$, which is defined herein as the time it takes from when the thermal fluid begins to flow at a steady rate to the point that the temperature at the outlet has risen to 25% of its final steady state value. The rate of rise can be characterized by measuring $t_{rise}$, which is defined herein as the time it takes the temperature at the outlet to rise from 25% to 75% of its final, steady-state value. It is preferred that the ratio $t_{delay}/t_{rise}$ be greater than 2, preferably greater than 5, more preferably greater than 10 and even more preferably greater than 50.

The ratio $t_{delay}/t_{rise}$ can also be determined from a thermocouple placed in one of the thermal channels at some distance $x_1$ along the length of the contactor, as long as $x_1$ is sufficiently far from the entrance that the temperature profile has had a chance to become developed, typically greater than 10% or preferably greater than 20% of the full length of the contactor. At any such location $x_1$ there will be a local value of quantity $t_{delay}$ and $t_{rise}$, based on the local change in temperature with time. For any such measurement locations, it is preferred that the local ratio $t_{delay}/t_{rise}$ be greater than 2, preferably greater than 5, more preferably greater than 10 and even more preferably greater than 50.

The quantity $t_{delay}/t_{rise}$ is a measure of the sharpness of the thermal wave or thermal gradient and is directly related to $\Delta T_{HT}$. The smaller the $\Delta T_{HT}$, the larger will be $t_{delay}/t_{rise}$. In general it is preferred to that the ratio $t_{delay}/t_{rise}$ be as large as can be achieved within practical design constraints. This makes the value of $\Delta T_{HT}$ as small as can be achieved within practical design constraints. One can also say that, if only considering the gradients (i.e. with no practical design constraints), then there is no minimum to the value of $\Delta T_{HT}$ and the value of $\Delta T_{HT}$ can be very close to zero. However, smaller $\Delta T_{HT}$ is generally achieved by using smaller channels that give higher pressure drops and other manufacturing obstacles. As such, practical considerations such as cost of construction, design capacity, feed and product properties, and other design parameters will dictate how small the value of $\Delta T_{HT}$ might be in a given application (equivalently how large the ratio $t_{delay}/t_{rise}$ might be).

Shorter cycle times provide the most compact and productive use of adsorbent, but also require the highest heat transfer coefficients. Methods for achieving high heat transfer coefficients in heat exchangers are well known in the art.

In the present invention, before the desorption step begins, molecules are preferentially adsorbed in the micropores or free volume of an adsorbent within the adsorbent channel. These molecules are preferentially taken up in the adsorption step where a multicomponent feed flows through a relatively cool adsorbent channel. The temperature of the channel at this point is significantly below the temperature that will be used to regenerate the adsorbent. It is preferred that the adsorption channels of the parallel channel contactor are designed so that the concentration gradients along the length of the channel formed during the adsorption step are relatively sharp. Sharp gradients are preferred because they enable feed to be passed through the bed for a long time before "breakthrough" of adsorbate occurs. If mass transfer is not adequate, then the gradient will be shallow. Such a condition results in adsorbate beginning to escape the bed long before the bed's capacity to adsorb is well utilized. In practice, high mass transfer is achieved by providing relatively small channels for the feed fluids to travel through. This is accomplished using beds of small adsorbent particles or using parallel channel contactors with small channel sizes. In a preferred embodiment, a space-filling adsorbent covers the walls of adsorbent channels in a parallel-channel contactor leaving a hydraulic radius for fluid flow that is preferably less than about 1 inch, more preferably less than about 0.25 inches, and even more preferably less than about 0.1 inches. A thermal wave separation can be created with adsorbent contactors that do not have low mesoporosity and macroporosity, but to obtain the highest possible recovery and purity, it is preferred to use an adsorbent contactor with low mesoporosity and macroporosity as are described herein. That is, the structured adsorbent contains less than about 20 vol %, preferably less than about 15 vol %, more preferably less than about 10 vol %, and most preferably less than about 5 vol % of its pore volume in open pores in the mesopore and larger size.

When feed enters the adsorbent channel at the start of the adsorption step, the adsorbent is relatively cool and molecules are taken up by the adsorbent near the point at which feed is introduced. The adsorbate concentration is high in the early part of the bed or layer, and at low concentration in the downstream part of the bed or layer. Ideally, there is a sharp gradient of adsorbate concentration along the length of the adsorbent channel. As operation proceeds, this concentration front moves along the length of the adsorbent channel. The dividing line between high concentration and low concentration zones gradually moves towards the bed exit as adsorbate accumulates in the adsorbent bed or layer.

In the present invention, with a feed for which many different components are selectively taken up by the adsorbent, it is possible to have multiple concentration fronts move along the length of the adsorbent during adsorption. Due to either strength of adsorption, or differences in diffusion coefficients between different species in the feed, the adsorbent will preferentially take up different feed components along the adsorbent length. The most preferred components will be referred to as the strongest-adsorbing components. The less preferred components will be referred to as the weakly-adsorbed components. During adsorption, the strongest-adsorbing components will occupy the regions of adsorbent closest to the inlet and will displace weakly-adsorbed materials from that region. Over the period of adsorption, the adsorbates will order themselves from strongest to weakest along the adsorbent from the inlet to the outlet of the adsorption channels. This type of patterning can occur for gaseous as well as liquid feeds, and TWA processes can be designed to operate with either type of feed. For the purpose of this example, a gaseous feed will be considered.

FIG. 10 (a) hereof shows schematically the patterning of adsorbates deposited along the length of the adsorbent layer 1019 at the end of an adsorption step for a multicomponent feed. The feed in this example is characterized as comprising species with four different adsorptions strengths, which are most weakly, weakly, less-strongly, and most-strongly adsorbed, in order of increasing adsorption strength. The strongly-adsorbed species are shaded a darker gray than the less strongly-adsorbed species. Layer 1019 would correspond to layer 205 in FIG. 4 and layer 405 in FIG. 6. A diffusion barrier 1017 acts as a wall separating molecules in the feed channel 1007 from those in the heating/cooling channel 1011. The wall separating the feed and heating/cooling channel 1017 would correspond to 219 in FIG. 4 and 415 in FIG. 6. The adsorbent channel 1007 would correspond to 203 in FIG. 4 and 403 in FIG. 6. The heating/cooling channel 1011 would correspond to cooling channels running from access points 223 to 225 in FIG. 4 and from 423 to 425 in FIG. 6.

In the adsorption step, the feed flowed in the direction from contactor end 1013 to the end 1015. As such, the strongly-adsorbed species were deposited closest to the end 1013. More weakly-adsorbed species were deposited closer to the end 1015. In this example, the flow of the hot fluid in the desorption step occurs in the same direction as feed that was flowed during the adsorption step. This is referred to as performing the adsorption and desorption in a co-current flow configuration. It should be noted that a TWA process can also be constructed with the adsorption and desorption steps occurring in a counter-current flow configuration.

Figure 10A:
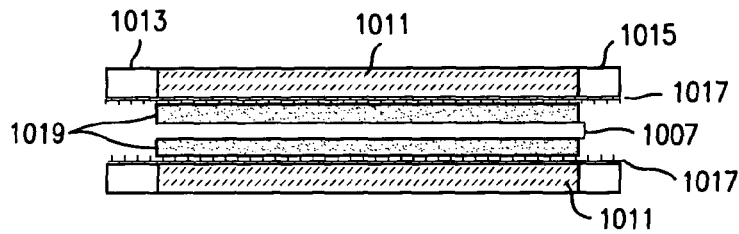
FIG. 10(a)-10(e) hereof show schematically the patterning of adsorbates deposited along the length of the adsorbent layer at the end of an adsorption step for a multicomponent feed. The strongly-adsorbed species are shaded a darker gray than the less strongly-adsorbed species.
Figure 10B:
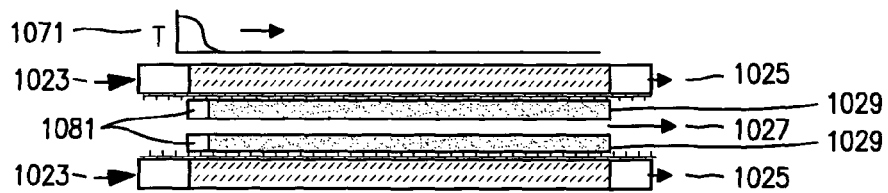
Figure 10C:
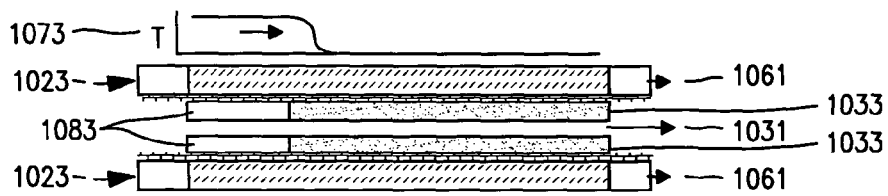

FIG. 10(b) hereof shows the state of the channels at the beginning of the desorption step of the present invention. At this point in time, hot fluid has begun to flow in the heating/cooling channel, with a hot stream flowing in from 1023 and a cooler stream 1025 flowing out. A thermal wave 1071 has begun to advance along the contactor. In this example there is very good thermal conductivity in the contactor. The temperature of the adsorbent layer closely follows the temperature of the heating/cooling channel. There is no imposed gas flow in the adsorbent channel 1007 in this example. A gas flow can optionally be added at any point in the desorption step to aid in the removal of molecules from adsorbent channel 1007. At this early stage, most of the adsorbate has been removed from the adsorbent layer in the lightly shaded region labeled 1081. Molecules have been released from the region of the adsorbent layer 1081 because its temperature has increased and adsorption isotherms are strongly influenced by temperature. The entrance end of the adsorption flow channel is valved off and desorbed molecules move down the adsorption channel to form stream 1027 that flows out of the contactor. As such, the strongly-adsorbed species move down the adsorption channel 1007 towards end 1015. As they move down the channel, they are readsorbed in the adsorbent layer (in some instances displacing the most weakly, weakly, and less-strongly-adsorbed species). The concentration of the strongly-adsorbed species in the shaded region of the adsorbent 1029 is then increased. Gas that is displaced into the stream 1027 flowing out of channel 1007 at this point is preferentially enriched in the most-weakly-adsorbed species. This first desorbed gas stream 1027 can therefore be separated from gas streams that evolve at later stages of the desorption step by use of a time actuated valve in an embodiment of the present invention to obtain multiple product streams with differing composition from a single adsorbent contactor FIG. 10(c) hereof shows the state of the channels at a later stage of the desorption step. At this point in time more hot fluid has flowed through the heating/cooling channels. A hot stream continues flowing in from 1023 and a cooler stream 1061 flows out of the contactor. The temperature of stream 1061 is slightly different from that of stream 1025 that was flowing out of the contactor at the earlier time shown in FIG. 10(b). At this stage of the process, the thermal wave 1073 has advanced further along the contactor. More of the strongly-adsorbed molecules have been displaced from the adsorbent layer 1083 because its temperature over a longer length has increased. The entrance end of the adsorption flow channel remains valved off and desorbed molecules move down the adsorption channel to form stream 1031 that flows out of the contactor. As the strongly-adsorbed molecules move down the channel they continue to re-adsorb in cooler region of the adsorbent layer 1033 and in some instances displace the most weakly, weakly, and less-strongly adsorbed species. The concentration of the strongly-adsorbed species in the shaded colder region of the adsorbent 1033 is thus increased. Gas that is displaced into the stream flowing out of channel 1033 is preferentially enriched in the weakly-adsorbed species. As in step 10(b) above, with a time-actuated valve, this second desorbed gas stream 1033 can be separated from product gas streams that evolve at later stages of the desorption step.

Figure 10D:
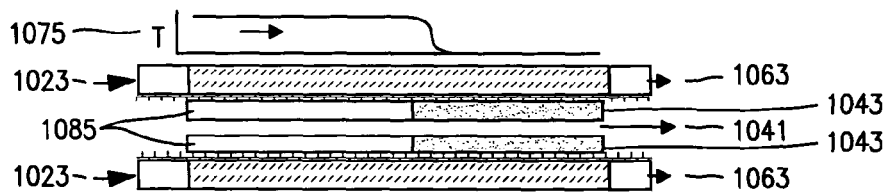

FIG. 10(d) hereof shows the state of the channels at an even later stage of the desorption step. At this point in time even more hot fluid has flowed through the heating/cooling channels. A hot stream continues flowing in from 1023 and a cooler stream 1063 flows out of the contactor. The temperature of stream 1063 is slightly different from that of stream 1061 that was flowing out of the contactor at the earlier time shown in FIG. 10(c). At this stage of the process, the thermal wave 1075 has advanced even further along the contactor, and more of the strongly bound molecules have been removed from the adsorbent layer and as can be seen in FIG. 10(d), the lightly shaded region labeled 1085 has grown with respect to the region 1083 at the earlier time shown in FIG. 10(c). More strongly-bound molecules have been displaced from the adsorbent layer in region 1085 because its temperature over a longer length has increased. The entrance end of the adsorption flow channel remains valved off and desorbed molecules move down the adsorption channel. As the strongly-bound molecules move down the channel they continue to readsorb in colder region of the adsorbent layer 1043 and in some instances displace the remaining most weakly, or weakly-adsorbed species as well as less strongly-adsorbed species. The concentration of the strongly-adsorbed species in the shaded colder region of the adsorbent 1043 is thus increased. Gas that is displaced into the stream flowing out of channel 1041 is preferentially enriched in the less strongly-adsorbed species. As in steps 10(b) and 10(c) above, with a time-actuated valve this third desorbed gas stream 1041 can be separated from product gas streams that evolve at later stages of the desorption step.

Figure 10E:
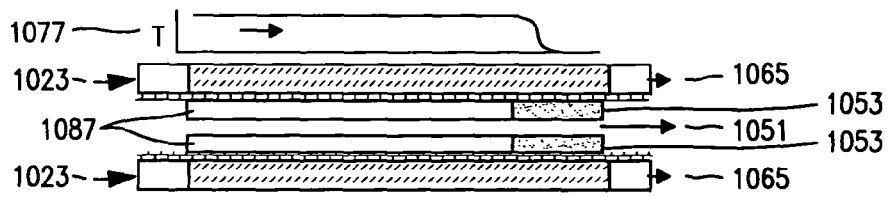

FIG. 10(e) hereof shows the state of the channels at an even later stage of the desorption step. At this point in time even more hot fluid has flowed through the heating/cooling channels. A hot stream continues flowing in from 1023 and a cooler stream 1065 flows out of the contactor. The temperature of this stream 1065 is slightly greater than that of stream 1063 which was flowing out of the contactor at the earlier time shown in FIG. 10(d). At this stage of the process, the thermal wave 1077 has advanced even further along the contactor, and more of the strongly-bound molecules been removed from the adsorbent layer and the lightly-shaded region labeled 1087 has grown with respect to the region 1085 at the earlier time shown in FIG. 10(d). More strongly-bound molecules have been displaced from the adsorbent layer in region 1087 because its temperature over a longer length has increased. The entrance end of the adsorption flow channel remains valved off and desorbed molecules move down the adsorption channel. As the strongly-bound molecules move down the channel they continue to re-adsorb in colder region of the adsorbent layer 1053 and in some instances displace the remaining most weakly, weakly-adsorbed species and less strongly adsorbed species. The concentration of the strongly-adsorbed species in the shaded colder region of the adsorbent 1053 is thus increased. In step 10(e), a fourth desorbed gas stream 1051 is shown that is preferentially enriched in the most strongly-adsorbed species. As in steps 10(b), 10(c), and 10(d) above, with a time-actuated valve this fourth desorbed gas stream 1051 can be separated from product gas streams that evolve at later stages of the desorption step.

At this point in the example, the desorption step is ended near the time (i.e., before or after) the thermal front breaks through the end of the contactor. However, as it can be seen, the present invention generates multiple product gas streams from a single desorption step of the adsorbent contactor utilizing a thermal wave process with multiple timed valving to segregate the different product gas streams. Although the example above illustrates a process for generating four desorbed product streams, it is clear to one of skill in the art that the process of the current invention can be utilized to generate any number of desorbed product streams. In a preferred embodiment of the present invention, a thermal wave process is utilized to generate at least two desorbed product streams. In more preferred embodiments of the present invention a thermal wave process, is utilized to generate at least three desorbed product streams, and even more preferably a thermal wave process, is utilized to generate at least four desorbed product streams. It should also be noted that in a preferred embodiment, each of the desorbed product streams produced have a different physical composition.

It is preferred that adsorption, desorption and cooling steps be performed sequentially in a TWA process. An advantage of this operation is that the heat used to swing the contactor is retained in the heat transfer medium. If adsorption was to proceed simultaneously with cooling, then a substantial part of the heat in the bed will be lost to the adsorbate-free feed, and a higher heat load will be needed to restore the high temperature of the heat transfer medium In a preferred embodiment of the present invention, the thermal wave process described in this example can be used to separate and captured $CO_2$ from flue gas.

EXAMPLE 2

In one embodiment of the present invention, a series of cross-flow contactors is used to create a parallel channel contactor that has separate and parallel adsorption and heating channels. In this embodiment, individual segments of a cross-flow contactor are stacked or arranged so that the average flow of fluid during regeneration is counter-current or co-current to the average direction of flow of flue gas during the adsorption step. One way to construct a cross-flow contactor is to coat one set of channels of a cross-flow heat exchanger with an adsorbent. Cross-flow exchangers are convenient configurations for use with the present invention because their compact configuration is achieved via high heat transfer coefficients. However, when heat and mass transfer is engineered to give temperature gradients in one set of channels and concentration gradients in the other, a single cross-flow exchanger would have some adsorption paths heat up (or cool down) earlier than others. This would lead to uneven performance, except in the cases in which the heat-up and cool-down steps are performed separately from the adsorption and regeneration steps.

FIG. 7 hereof shows a cut away view of a cross-flow contactor that has segments stacked so that the average flow of fluid during regeneration is countercurrent to the direction of flow during the adsorption step. The cross-flow contactor is constructed from a cross-flow heat exchanger which has impermeable walls separating two sets of flow channels. The wall 701 can be comprised of a material selected from the group consisting of metals, ceramics; and low gas permeability polymers. Flow channels 709, 711, and 702 are lined with a layer 703 containing an adsorbent. FIG. 7 shows the flow channel lined with similar adsorbent layers 703, but optionally one can use different adsorbent layers to line each of the adsorbent lined flow channels 709, 711, and 702. Process and produced gasses are passed through the adsorbent lined flow channels 709, 711, and 702. The layer 703 contains at least one adsorbent selective for one or more of $CO_2$, water, SOx or NOx. The layer 703 can also contain micropores, mesopores, a filler material such as a polymer, a binder material, and a heat adsorbing material.

During the adsorption step, flue gas is flowed through the adsorbent lined flow channels 702, 709, and 711 and passed sequentially (705 to 715 to 725) from adsorbent lined channels in one cross-flow segment to another (i.e. 711 to 709 to 702. During the desorption step hot fluid (gas or liquid) is passed through the heating/cooling channels 708, 710, and 712 in the contactor that are lined with the material 701 used to form the cross-flow heat exchanger. During the desorption step the fluid flowing in the heating/cooling channels 708, 710, and 712 passes counter-currently (735 to 745) to the average direction of flow during the adsorption step (705 to 715 to 725).

In the arrangement shown in FIG. 7 the cross-flow contactor segments are stacked, with both heating/cooling channels and adsorption channels connected in series. In FIG. 7, the fluid (thermal or process) flows in a series fashion through every alternating channel in a cross flow module. For example, the process fluid first flows across the $1^{st}$ (bottom-most) channel, then across the $3^{rd}$ channel, then $5^{th}$, etc. In one embodiment of the present invention, each pair of channels in FIG. 7 is replaced by an entire module including many channels of parallel-flowing process fluid that are heat exchanges against many channels of parallel-flowing thermal fluid. In this embodiment, streams 705 and 745 are connecting entire modules of cross-flow heat exchange, and not single channels. Even though each individual cross-flow module does not act in co-flow or counter-flow mode, the combination of several modules in series will perform in co-flow or counter-flow mode. This is analogous to connecting a number of continuous stirred tank reactors (CSTR's) together to simulate a plug flow reactor. One advantage of this arrangement is that the axial conductivity of the whole multi-module arrangement is very low. This facilitates the use of metal in the heat exchange portions without degrading the temperature gradients that pass through the module during regeneration. In one embodiment of the present invention, the segmented cross-flow contactors are prepared with different adsorbents so as to create an adsorbent gradation in the overall contacting unit. This arrangement can facilitate multicomponent adsorption, which may have value either because the different components are to be recovered separately, or because a first removed component would interfere with the functioning of a downstream adsorbent (e.g. removing $H_2O$ before a $CO_2$ adsorbent). In another embodiment of the present invention, the modules are piped so that desorbed material can be collected individually from one or more modules as a temperature wave moves through. That is, the adsorption channel system of the modules may be connected in series for the purpose of adsorption but in parallel for the purpose of regeneration.

This design approximates a plug flow channel system can be approximated by connecting a large number of cross-flow (or well-stirred contactors) in series. We have discovered that a plug flow channel system that is in parallel orientation with a second plug-flow channel system can be approximated using a series of cross-flow heat-exchange contactors. Cross-flow contactors have two sets of channels, with each set of channels having fluid flow at approximately 90° orientation to the other set. A cross-flow heat exchanger can have many high-conductivity (typically metal) plates that are stacked with a gap in between one plate and the next. The series of plates defines a series of gaps 707, 709, 711, 708, 710, and 712. In a cross-flow heat exchanger, the odd-numbered gaps (707, 709, and 711) would constitute one set of channels and would carry a fluid traveling in one direction. The even numbered gaps (708, 710, and 712) would constitute the second set of channels and would carry a different fluid traveling in a direction 90° rotated from the first fluid. This cross-flow arrangement is convenient for fabrication. In the present embodiment, the parallel channel contactor is created by using a number of cross-flow contactors, by connecting the first set of channels of each contactor in series fashion, and by connecting the second set of channels of each contactor in the identical series order. Connected in this fashion, the two resulting channel systems can be operated in co-flow or counter-flow orientation.

In one embodiment of the present invention, an adsorbent is coated in one or both sets of channels of a series of cross flow heat exchangers. In a preferred embodiment the adsorbent has a low volume of mesopores and macropores. When the adsorbent is coated on one set of channels of the heat exchanger elements, the series connection is such that the heating or cooling in of one set of channels is coupled with adsorption or desorption in the other set of channels. The system of cross-flow heat exchangers connected in series approximates the behavior of a parallel channel contactor and can be used in similar fashion. When the heating/cooling channels are used in a fashion that generates a thermal wave, only a small part of that wave will manifest itself in any single cross-flow contactor. Because the exchangers are coupled in series a thermal wave can propagate along the series of exchangers (or stack of exchangers).

EXAMPLE 3

This example illustrates use of a parallel contactor in a separation that removes $CO_2$ from flue gas in a thermal swing adsorption process. Flue gas or stack gas is emitted in a wide variety of industrial processes. Pressure of the flue gas is typically slightly above atmospheric pressure and is generally less than two atmospheres. The temperature of the flue gas is typically in a range from about 150° C. to about 250° C. The major components in the gas are typically $N_2$, $O_2$, $CO_2$, and $H_2O$, Small quantities of pollutants such as $NO_x$ and $SO_x$ are often present. $CO_2$ concentration in the gas is usually in a range from 3 mol % to 15 mol % and $H_2O$ in the gas is usually in a range from 0.1 mol % to 15 mol %. The total molar concentration of $CO_2+H_2O$ is usually less than about 25 mol % when a stoichiometric combustion produces the stack gas and is usually less than about 15 mol % when dilution or excess air is employed in the process to limit the temperature in the higher temperature portion of the process. For example gas turbines use dilution air to limit the temperature of the combustion gas before it reaches the blades of a power turbine.

A thermal wave adsorption process is employed to remove $CO_2$ from hot stack gas. The thermal wave adsorption process uses a parallel channel contactor to remove more than about 70 mol % of the $CO_2$ out of the stack gas, preferably more than about 80 mol % of the $CO_2$ out of the stack gas, even more preferably more than about 90 mol % of the $CO_2$ out of the stack gas and most preferably more than about 95 mol % of the $CO_2$ out of the stack gas. At least one $CO_2$ rich stream is produced in the process that has a purity such that it contains more than about 70 mol % $CO_2$, preferably more than about 80 mol % $CO_2$ and even more preferably more than about 90 mol % $CO_2$ and most preferably more than about 95 mol % $CO_2$.

This example illustrates a thermal wave process with sequential adsorption, desorption and cooling steps operated with three parallel contactor units. Those skilled in the art can construct several other potential embodiments of thermal wave process to remove $CO_2$ from flue gas using this example. Many of these embodiments involve the use of other numbers of contactors to construct a process.

Figure 11A:
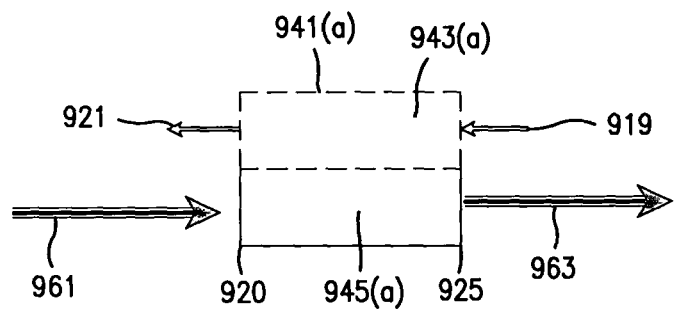
FIG. 11 hereof is an illustration of a three contactor parallel channel unit that can be used herein.
Figure 11B:
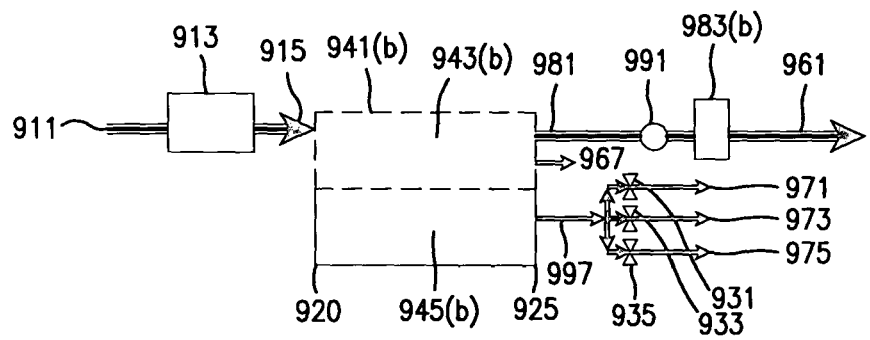
Figure 11C:
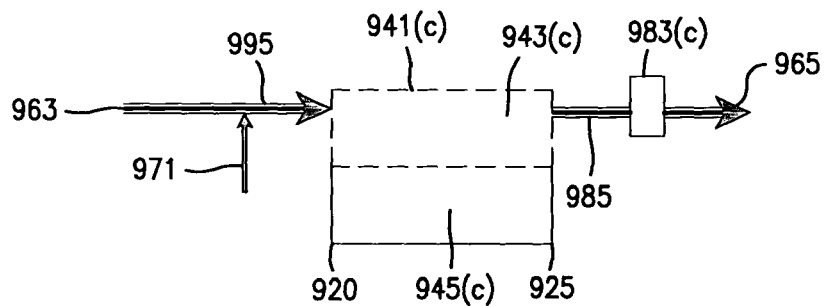

In the three unit operation of this example, one contactor undergoes an adsorption step while another contactor undergoes a desorption step and yet another contactor is being cooled. A diagram of the three unit process is shown in FIG. 11 hereof. FIG. 11(a) shows the streams flowing into and out of the contactor 941(a) during the adsorption step. FIG. 11(b) shows the streams flowing into and out of the contactor 941(b) during the desorption/regeneration step. FIG. 11(c) shows the streams flowing into and out of the contactor 941(c) during the contactor cooling step. The contactors 941(a), 941(b) and 941(c) are substantially similar. Properties of the contactors are similar to those discussed for FIG. 8 hereof with each contactor having an array of heating/cooling channels 943 and adsorbent channels 945.

In this example, the adsorbent contains a microporous material. The microporous material is chosen so that at the temperature of the adsorption step in the process it adsorbs more than about 0.25 millimole of $CO_2$ per $cm^3$ of adsorbent from an atmospheric gas mixture containing about 90 mol % $N_2$ and about 10 mol % $CO_2$. In a preferred embodiment the adsorbent contains at least a microporous material, such that at the temperature of the adsorption step in the process, it will adsorb more than about 0.75 millimole of $CO_2$ per $cm^3$ of adsorbent from an atmospheric gas mixture containing 90 mol % $N_2$ and 10 mol % $CO_2$. In a more preferred embodiment the adsorbent contains at least a microporous material such that, at the temperature of the adsorption step in the process, it will adsorb more than about 1.5 millimole of $CO_2$ per $cm^3$ of adsorbent from an atmospheric gas mixture containing 90 mol % $N_2$ and 10 mol % $CO_2$. Depending upon design, the adsorption step can be conducted in a temperature range from about 2° C. to about 60° C., preferably in a temperature range from about 5° C. to about 45° C. and more preferably in a range from about 5° C. to about 35° C.

Depending upon design, the adsorption step can be conducted in a temperature range from about 5° C. to about 60° C., preferably in a temperature range from about 5° C. to about 45° C. and more preferably in a range from about 2° C. to about 35° C. The microporous material can be a zeolite such as zeolite 4A, 5A, 13X, NaX, and NaY. It is also within the scope of this invention that a hydrotalcite be used as the microporous material for the treatment of a flue gas stream. It is also possible for the microporous material to be made from a framework containing elements other than Si or Al, such as P. Another candidate adsorbent material is microporous carbon. Microporous sol-gel derived materials and silicas can also be candidate adsorbent materials. These materials can be used alone or in combination with other materials. It is preferred that the adsorbent in the contactor have low mesoporosity and macroporosity. That is, the structured adsorbent contains less than about 20 vol %, preferably less than about 15 vol %, more preferably less than about 10 vol %, and most preferably less than about 5 vol % of its pore volume in open pores in the mesopore and larger size. As previously described, the low mesoporous and macroporous adsorbent can contain a blocking agent.

Regeneration of the adsorbent is done with heat contained in the stack gas and FIG. 11(b) shows the stream flow into and out of the contactor being regenerated 941(b). Stack gas 911 enters the "heating/cooling channel" (as opposed to the adsorbent channel) at the temperature at which it is produced which is in a range from about 150° C. to about 250° C. When the regeneration process starts the temperature of contactor 941(b) is in a range from about 2° C. to about 35° C. Before the stack gas 911 enters the contactor 941(b) the stream 911 can optionally be fed through a process block 913 that removes particulates. Several different methods to remove particulates can be used including filtration with ceramic candle filters, monolithic inorganic (metal or ceramic) filters, tubular metal filters, polymeric, or bag filters. Alternatively an electrostatic precipitator can be used to remove particulates. A stream 915 that is nearly at the same temperature of the flue gas stream 911 emerges from the optional process block 913 and enters the heating/cooling channels 943(b) of parallel channel contactor 941(b). At the start of the desorption step the microporous adsorbent material in the contactor contains adsorbed $CO_2$. It is preferred that at the beginning of the regeneration step (i.e. after the adsorption step is complete) the volume averaged $CO_2$ loading in the adsorbent be greater than about 0.25 milli-mole per $cm^3$ of adsorbent material. A specific example of loading in the most preferred range would be an average $CO_2$ loading of 1.7 milli-mole per $cm^3$ of the microporous adsorbent material. As the stream 915 begins to flow into the contactor 941(b), gas begins to flow out of the adsorption/cooling channels 943(b) forming stream 981. When the process starts stream 981 is at the initial temperature of the contactor. As a thermal wave of the type described herein moves through the contactor the temperature of stream 981 increases slightly. The temperature of stream 981 increases sharply when the thermal wave moves through the contactor. It is preferable not to terminate the desorption step before the thermal wave has moved through the contactor. If the thermal wave breaks through the contactor before the adsorption step (FIG. 11a) has been completed, then an additional thermal bed 983(b) can be employed to soak up heat until it is time to stop the adsorption, desorption/regeneration and contactor cooling steps. The thermal bed 983(b) can be a packed bed of solid particles through which a thermal wave also passes. If the thermal mass is a packed bed of solid particles its temperature at the start of the regeneration process is near that of the adsorbent bed.

It is preferred that the regeneration and cooling steps be terminated for the thermal front to break through the contactor before the adsorption. To ensure that the thermal front breaks through the contactor, the total mass of the adsorbent layer and barrier wall between the adsorption channel and heating/cooling channel should be less than about 10 times the mass of the adsorbent materials, preferably less than about 5 times the mass of the adsorbent materials, even more preferably less than about 2 times the mass of the adsorbent materials and most preferably less than about 1.5 times the mass of the adsorbent materials.

As the thermal wave moves through contactor 941(b) being regenerated water condenses out of the gas stream. Condensation occurs because the temperature of the gas falls as it passes along the contactor. The concentration of water vapor in gas stream 981 coming out of the heating/cooling channels 943(b) is nearly that for saturated gas at the temperature of stream 981 which can be more than about 100° C. lower than the stream 911 entering the regenerator. Because liquid water falls out of the stream 915 passing through the contactor 941(b) being regenerated, it can be advantageous to align the contactor so that the gas flows downward and the liquid flows under action of gravity concurrently with the gas to the bottom of the contactor. An optional method can be provided to remove condensed water from the contactor to form water stream 967. Optionally a knockout 991 can be provided to remove any mist of liquid water flow coming out of the contactor. It is preferred that there is not a significant amount of liquid phase water flowing along with the cooled partially dehydrated flue gas stream 961.

In this example the gas passing through the heating/cooling channels of the contactor 943(b) moves in the same direction as gas passing through the adsorption channels 945(a) during the adsorption step (i.e. co-currently). This type of co-current thermal wave desorption process was described in detail in Example 17. Elements 920 and 925 as shown in FIG. 11, represent the inlet end and outlet end of the adsorption channels, respectively. In this example the microporous adsorbent is chosen such that $H_2O$ is a strongly adsorbed species, $CO_2$ is adsorbed somewhat less strongly, and $N_2$ and $O_2$ are weakly adsorbed. Examples of microporous materials that have this ordering of adsorption include zeolites such as zeolite 4A, 5A, 13X, NaX, and NaY. Trace materials such as $SO_x$ and $NO_x$ can be very strongly adsorbed. The following description of regenerator operation will apply to a contactor that was designed and operated to remove most of the $CO_2$ from the flue gas and the description will focus on the majority components in the flue gas. The process described will capture much of the $SO_x$ and $NO_x$ from the gas stream. It should be noted that it is possible to use the principles described in this example to remove $SO_x$ and $NO_x$ from gas streams in a process that captures less of the $CO_2$.

In the co-current thermal wave desorption process the least strongly adsorbed $N_2$ and $O_2$ species flow out of the contactor in the initial phase of the desorption process forming stream 997. It can be advantageous to divide the stream 997 coming out of the contactor into streams emerging at earlier versus later times, because streams emerging at different times will have different $CO_2$ and $H_2O$ concentrations and thus may preferably be processed in different manors. In an optional embodiment of the process valve 931 is opened at the start of the regeneration step allowing stream 997 to flow and form stream 971. Stream 971, recovered early in the regeneration, has very low $CO_2$ concentration. In the process shown in FIG. 11 hereof this stream is combined with stream 963 which is ultimately vented through a stack. As time progresses, the concentration of $CO_2$ in stream 971 begins to increase and valve 931 is closed to stop flow in stream 971. In this optional embodiment valve 933 is "simultaneously" opened to start flow in stream 973. The time at which these valves actuate sets the $CO_2$ purity in stream 973. Alternatively valve 933 was opened at the start of the regenerations process allowing stream 997 to flow and form stream 973. Stream 973 contains the majority of the $CO_2$ that was originally in the stack gas. The concentration of $CO_2$ in stream 973 is high enough that it can be sent to a sequestration process with little or no additional processing. In this example the stream is produced at atmospheric or slightly higher than atmospheric pressures. It is possible to design processes producing stream 973 from pressures ranging from vacuum to several (approximately 3) atmospheres. It is less desirable to produce stream 973 at sub-atmospheric pressures because this increases costs of compression in CO2 sequestration processes.

Stream 973 can be sent to different types of $CO_2$ sequestration processes. Non-limiting examples include sending the $CO_2$ into underground formations such as aquifers with a top seal that prevents significant loss of injected acid gas components, oil reservoirs, gas reservoirs, depleted oil reservoirs and depleted gas reservoirs. Deep open storage is also a potential disposition for the $CO_2$, through purity requirements can be anticipated to be more stringent. Typically the separated $CO_2$ and $H_2S$ has to be compressed to pressures greater than about 2,000 psi and often to pressures greater than about 5,000 psi to be injected into these types of underground formations. Several properties of stream 973 make it suitable for compression in a sequestration process. These properties include the fact that its temperature is significantly below that of the stack gas and it is highly concentrated in $CO_2$. In some instances additional processing is required before stream 973 is sequestered. A non-limiting example of an additional processing step would be a more rigorous dehydration of the stream to mitigate potential corrosion in pipes and compressors used in the sequestration process. Towards the end of the regeneration process the $H_2O$ concentration in stream 973 increases. To minimize potential corrosion problems in equipment used to sequester $CO_2$ it can be advantageous to separate the stream coming out towards the end of the regeneration process and to handle this stream separately. In an optional embodiment when the $H_2O$ concentration in stream 973 increases above a desired threshold, valve 933 is closed and valve 935 is opened. This stops flow of stream 973 and starts flow of stream 975 that has a higher concentration of water. Stream 975 can then be dehydrated separately and then recombined with stream 971.

The cool partially dehydrated flue gas stream 961 coming out of the contactor being regenerated, 941(b), is sent to contactor 941(a) that is undergoing an adsorption step. The stream 961 is sent through the adsorption channels 945(a) of the contactor where a microporous adsorbent preferentially removes $CO_2$ and $H_2O$. Contactor 941(a) can optionally be constructed with several different microporous adsorbents along the length of the channels 945(a). In one embodiment where different microporous adsorbents are placed along the length of the channels 945 (a), the adsorbent that is most selective for $H_2O$ is placed at the beginning of the channels. In this manner the water vapor partial pressure in the stream can be reduced allowing adsorbents towards the end of the channel to operate more effectively for $CO_2$ removal. Zeolites with large cation concentrations such as 4A, 5A, NaX are examples of microporous adsorbents that can operate more effectively when they are dry. The reason for this is that the $CO_2$ adsorption isotherm of zeolites with large cation concentrations tends to increase when the zeolite is dry (i.e. the $CO_2$ isotherm of a dry cationic zeolite usually lies above a wet zeolite). Materials that can be used to remove water include silica, alumina, carbons, and zeolites.

In this example a single type of microporous adsorbent lines the adsorbent channels 945(a). At the start of the adsorption process the temperature of the contactor 941(a) is the same as that produced at the end of the cooling step in FIG. 11(c). This temperature is slightly above that of the ambient air in the atmosphere. As the adsorption step begins $CO_2$ and $H_2O$ are selectively taken up by the adsorbent near the front end 920 of the contactor. The concentration of $CO_2$ and $H_2O$ in the remaining portion of the adsorbent is low and nearly equal to that at the end of the regeneration step in FIG. 11(b) and the $CO_2$ concentration of gas stream 963 coming out of the contactor 941(a) is less than 5% of that in the flue gas stream 911.

In this example the microporous adsorbent has the property that $H_2O$ is more strongly adsorbed than $CO_2$. An example of a microporous zeolite adsorbent with this property is zeolite 5A. For this zeolite as well as any other microporous adsorbent the temperature increases when molecules are adsorbed. The temperature rise is determined by the heat of adsorption of the sorbed species, the amount adsorbed; the thermal conductivity in the contactor, and the thermal mass of the contactor. An optional stream 919 can be flowed through the contactor to limit the temperature rise in the contactor. Stream 919 is derived from the ambient air and is blown through the heating/cooling channels 943(a) of the contactor. In the embodiment shown in FIG. 11(a) it moves counter-currently to stream 961 that flows through the adsorption channels. The stream 919 removes heat generated by the heat of adsorption and forms stream 921 exiting the contactor that carries away most of this heat. In a different embodiment this optional stream 919 can flow co-currently with stream 961.

As the adsorption step continues relatively sharp concentration fronts in the adsorbed phase concentration (i.e. adsorbates in the microporous material lining the channel) move along the length of the contactor. The concentration front for $H_2O$ is closer to the entrance of the adsorber channel than that for $CO_2$. The way in which they move with time down the length of the adsorber channel is referred to as concentration waves. With time these waves or fronts advance along the length of the adsorption channel. As these waves advance, the $CO_2$ concentration in the outlet stream 963 remains low until $CO_2$ front reaches the end of the contactor 925. At this point in time the $CO_2$ concentration in the outlet stream 963 begins to rise and the adsorption step is stopped.

The cool stream 963 (with the $CO_2$ removed) is routed to a contactor 941(c) that has been regenerated and is undergoing a cooling step. Additional cool gas produced in the regeneration process (stream 971) can optionally be added to stream 963 to form stream 995. This stream 995 is introduced into the heating/cooling channels of the contactor 941(c). At the start of the cooling step contactor 941(c) is near the temperature of the flue gas stream 911. As stream 995 begins to flow through the contactor a cooing thermal wave develops. This cooling wave is such that the temperature of the contactor near the inlet side 920 is low and at a sharp front located further along the length of the contactor the temperature rises abruptly. The gas exiting the contactor 985 remains hot as the thermal wave advances across the contactor. If an optional thermal mass 983 is used in the regeneration step then the gas stream 985 can also be passed through the thermal mass 983(c). When a thermal mass is used in the process the thermal wave breaks through the end of the contactor and cools the thermal mass before the cooling process is terminated. In this optional embodiment the gas stream exiting the thermal mass 965 remains hot during the majority of the cooling step. The hot gas stream 965 is substantially free of $CO_2$ and can be vented or sent up a stack. The cooling step is terminated simultaneously with the adsorption and regeneration steps. Throughout the cooling step there is no flow out of the adsorbent channels 945(c).

What is claimed is:

1. A process for selectively removing a first target gas component from a gas mixture containing said first target gas component and a product gas component, said process comprising:
   a) providing a temperature swing adsorption gas separation unit containing at least one adsorbent contactor at an initial temperature, wherein the adsorbent contactor is comprised of a plurality of substantially parallel open flow channels, and wherein the channel surface of at least a portion of said flow channels is comprised of an adsorbent material that has a selectivity for said first target gas component over said product gas component of greater than 1;
   b) passing said gas mixture through at least a fraction of said flow channels thereby resulting in the adsorption of at least a portion of said first target gas component from the gas mixture onto said adsorbent material, thereby producing a first product gas stream, that has a lower mol % of the first target gas component than said gas mixture;
   c) collecting said product gas stream;
   d) heating said at least one adsorbent contactor having said first target gas component adsorbed thereon with a heat transfer fluid to an effective temperature that will result in the desorption of at least a fraction of said first target gas component from said adsorbent material, thereby resulting in a first waste gas stream that has a higher mol % concentration of the first target gas component than said gas mixture;
   e) collecting said first waste gas stream; and
   f) cooling said at least one adsorbent contactor to the initial temperature;
   wherein a thermal wave is generated in the adsorbent contactor in the desorption step d) thereby creating a thermal wave temperature gradient, which thermal wave temperature gradient moves along the length of the at least one adsorbent contactor and which adsorbent contactor has a $\Delta T_{HT}$ ranging from about 0 to about 50° C. wherein $\Delta T_{HT}$ =H/h wherein $\Delta T_{HT}$ is the heat transfer delta-temperature, h is equal to the heat transfer coefficient, and H is the heat rate requirement.

2. The process of claim 1 wherein desorption is performed by passing the heat transfer fluid, at an effective desorption temperature, through the same flow channels as said gas mixture, thereby desorbing at least a portion the first target gas component into said heat transfer fluid.

3. The process of claim 2 wherein the heat transfer fluid is comprised of steam.

4. The process of claim 2 wherein the gas mixture is comprised of a flue gas, the first target gas component is $CO_2$, and at least a portion of the $CO_2$ is separated from the heat transfer fluid after desorption.

5. The process of claim 1 wherein the gas mixture is comprised of a flue gas and the first target gas component is $CO_2$.

6. The process of claim 5 wherein the first waste gas stream has a $CO_2$ concentration of at least 80 mol %.

7. The process of claim 1 wherein a thermal wave temperature gradient, which thermal wave temperature gradient moves along the length of the at least one adsorbent contactor, is produced during the cooling step f).

8. The process of claim 1 wherein the adsorbent contactor has less than about 20% of its open pore volume in pores greater than about 20 angstroms.

9. The process of claim 1 wherein the adsorbent material is comprised of an 8-ring zeolite.

10. The process of claim 1 wherein the gas mixture also comprises a second target gas component, wherein following step e) and prior to step f) the process comprises the steps of:
   e1) heating said at least one adsorbent contactor having said first target gas component and a said second target gas component adsorbed upon said adsorbent material with a heat transfer fluid to an effective temperature that will result in the desorption of at least a fraction of said second target gas component from said adsorbent material, thereby resulting in a second waste gas stream that has a higher mol % concentration of the said second target gas component than said gas mixture; and
   e2) collecting said second waste gas stream.

11. The process of claim 10 wherein said first waste gas stream has a higher mol % of said first target gas component than said second waste gas stream.

12. The process of claim 10 wherein said second waste gas stream has a higher mol % of said second target gas component than said first waste gas stream.

13. The process of claim 10 wherein the adsorbent contactor is comprised of a first adsorbent material and a second adsorbent material, wherein said first adsorbent material has a selectivity of greater than 5 for said first target gas component over said product gas component and said second adsorbent material has a selectivity of greater than 5 for said second target gas component over said product gas component.

14. The process of claim 1 wherein the plurality of substantially parallel open flow channels are divided into a first fraction of flow channels and a second fraction of flow channels, wherein said first fraction and second fraction are in thermal communication with each other but not in fluid communication; and said gas mixture in step b) is passed through said first fraction of the plurality of substantially parallel open flow channels having channel surfaces comprised of said adsorbent material; and said heat transfer fluid in step d) is passed through the second fraction of the plurality of substantially parallel open flow channels.

15. The process of claim 14 wherein the gas mixture is comprised of a flue gas and the first target gas component is $CO_2$.

16. The process of claim 15 wherein the flue gas is comprised of $N_2$ and said adsorbent material has a selectivity for $CO_2$ over $N_2$ of greater than 5.

17. The process of claim 14 wherein the adsorbent contactor has less than about 20% of its open pore volume in pores greater than about 20 angstroms.

18. The process of claim 14 wherein the adsorbent is comprised of an 8-ring zeolite.

19. The process of claim 18 wherein the zeolite is selected from DDR, Sigma-1 and ZSM-58.

20. The process of claim 1 wherein the adsorbent contactor is further comprised of second set of flow channels that are not substantially parallel to said substantially parallel open flow channels, wherein said gas mixture flows through said substantially parallel open flow channels and said heat transfer fluid flows through said second set of flow channels.

21. The process of claim 20 wherein the flow direction of said gas mixture in said substantially parallel open flow channels is at a substantially 90° angle to the flow direction of said heat transfer fluid in said second set of flow channels.

22. The process of claim 1 wherein said adsorbent material is located on the inner surface of said substantially parallel open flow channels.

23. The process of claim 1 wherein said adsorbent material is located on the outer surface of said substantially parallel open flow channels.

24. The process of claim 1 wherein the adsorbent contactor is comprised of a first adsorbent material and a second adsorbent material, wherein said first adsorbent material has a selectivity of greater than 5 for said first target gas component over said product gas component and said second adsorbent material has a selectivity of greater than 5 for a second target gas component over said product gas component.

25. The process of claim 1 wherein the gas mixture is comprised of a flue gas and the first target gas component is selected from the group consisting of water, $CO_2$, $SO_x$, and $NO_x$.

26. The process of claim 25 wherein the product gas component is $N_2$.

27. The process of claim 26 wherein the adsorbent material has a selectivity of greater than 5 for said first target gas component over said product gas component.

28. The process of claim 1 wherein the thermal wave during desorption moves through the adsorbent contactor counter-current to the direction that the gas mixture flowed through the adsorbent contactor.

29. The process of claim 1 wherein the thermal wave during desorption moves through the adsorbent contactor co-current to the direction that the gas mixture flowed through the adsorbent contactor.

30. The process of claim 1 wherein adsorbent contactor has a $\Delta T_{HT}$ ranging from about 0 to about 10° C.

31. The process of claim 1 wherein the gas mixture is comprised of a natural gas, the first target component is $CO_2$, and the product gas component is $CH_4$;
   wherein the product gas stream contains at least 80 mol % of the $CH_4$ present in the gas mixture.

32. The process of claim 1 wherein in the adsorbent contactor there is a local $t_{delay}/t_{rise}$ ratio of greater than 2.

33. The process of claim 1 wherein at least a portion of step b) and at least a portion of step f) occur simultaneously in said adsorbent contactor.

34. The process of claim 1 further comprising wherein:
   said temperature swing adsorption unit contains at least a first adsorbent contactor and a second adsorbent contactor wherein the gas mixture flows through a first set of substantially parallel channels located in said first adsorbent contactor from a process gas inlet of said first adsorbent contactor to a process gas outlet of said first adsorbent contactor from which a first adsorbent contactor product outlet stream is retrieved; and
   at least a portion of first adsorbent contactor product outlet stream flows through a second set of substantially parallel channels located in said second adsorbent contactor from a process gas inlet of said second adsorbent contactor to a process gas outlet of said second adsorbent contactor from which a second adsorbent contactor product outlet stream is retrieved; and wherein
   a heat transfer fluid flows through a third set of flow channels located in said first adsorbent contactor which said third set of flow channels are in thermal communication with, but not in fluid communication with, said first set of substantially parallel channels, from a heat transfer fluid inlet of said first adsorbent contactor to a heat transfer fluid outlet of said first adsorbent contactor wherein a first adsorbent contactor heat transfer fluid outlet stream is retrieved; and
   at least a portion of said first adsorbent contactor heat transfer fluid outlet stream flows through a fourth set of channels located in said second adsorbent contactor which said fourth set of flow channels are in thermal communication with, but not in fluid communication with, said second set of substantially parallel channels, from a heat transfer fluid inlet of said second adsorbent contactor to a heat transfer fluid outlet of said second adsorbent contactor wherein a second adsorbent contactor heat transfer fluid outlet stream is retrieved; and wherein the flow of the first adsorbent contactor product outlet stream from the first adsorbent contactor to the second adsorbent contactor is substantially in co-current flow with the flow of the first adsorbent contactor heat transfer fluid outlet stream from the first adsorbent contactor to the second adsorbent contactor.

35. The process of claim 1 further comprising wherein:

said temperature swing adsorption unit contains at least a first adsorbent contactor and a second adsorbent contactor wherein the gas mixture flows through a first set of substantially parallel channels located in said first adsorbent contactor from a process gas inlet of said first adsorbent contactor to a process gas outlet of said first adsorbent contactor from which a first adsorbent contactor product outlet stream is retrieved; and at least a portion of first adsorbent contactor product outlet stream flows through a second set of substantially parallel channels located in said second adsorbent contactor from a process gas inlet of said second adsorbent contactor to a process gas outlet of said second adsorbent contactor from which a second adsorbent contactor product outlet stream is retrieved; and wherein a heat transfer fluid flows through a third set of flow channels located in said second adsorbent contactor which third set of flow channels are in thermal communication with, but not in fluid communication with, said second set of substantially parallel channels, from a heat transfer fluid inlet of said second adsorbent contactor to a heat transfer fluid outlet of said second adsorbent contactor wherein a second adsorbent contactor heat transfer fluid outlet stream is retrieved; and at least a portion of said second adsorbent contactor heat transfer fluid outlet stream flows through a fourth set of channels located in said first adsorbent contactor which fourth set of flow channels are in thermal communication with, but not in fluid communication with, said first set of substantially parallel channels from a heat transfer fluid inlet of said first adsorbent contactor to a heat transfer fluid outlet of said first adsorbent contactor wherein a first adsorbent contactor heat transfer fluid outlet stream is retrieved; and wherein the flow of the first adsorbent contactor product outlet stream from the first adsorbent contactor to the second adsorbent contactor is substantially in counter-current flow with the flow of the second adsorbent contactor heat transfer fluid outlet stream from the second adsorbent contactor to the first adsorbent contactor.

\* \* \* \* \*